(12) United States Patent
Lynn et al.

(10) Patent No.: US 10,875,197 B2
(45) Date of Patent: *Dec. 29, 2020

(54) ROBOTIC ACTUATOR

(71) Applicant: Other Lab, LLC, San Francisco, CA (US)

(72) Inventors: Peter S. Lynn, Oakland, CA (US); Saul Griffith, San Francisco, CA (US); Kevin Albert, San Francisco, CA (US)

(73) Assignee: OTHER LAB, LLC, San Francisco, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 15/793,591

(22) Filed: Oct. 25, 2017

(65) Prior Publication Data

US 2018/0056526 A1  Mar. 1, 2018

Related U.S. Application Data

(63) Continuation of application No. 14/064,071, filed on Oct. 25, 2013, now Pat. No. 9,821,475.
(Continued)

(51) Int. Cl.
*B25J 18/06* (2006.01)
*B25J 9/14* (2006.01)
(Continued)

(52) U.S. Cl.
CPC .............. *B25J 18/06* (2013.01); *B25J 9/142* (2013.01); *F03G 6/02* (2013.01); *F16J 3/04* (2013.01); *F24S 23/74* (2018.05); *F24S 30/425* (2018.05); *F24S 30/428* (2018.05); *F24S 30/452* (2018.05); *F24S 30/48* (2018.05); *F24S 50/00* (2018.05); *F24S 50/20* (2018.05); *H02S 20/32* (2014.12); *H02S 40/00* (2013.01); *B25J 9/00* (2013.01);
(Continued)

(58) Field of Classification Search
CPC combination set(s) only.
See application file for complete search history.

(56) References Cited

U.S. PATENT DOCUMENTS

| 979,460 A | 12/1910 | Fulton |
| 2,920,656 A * | 1/1960 | Bertolet, Jr. ............ F16D 3/845 92/42 |

(Continued)

FOREIGN PATENT DOCUMENTS

| CA | 2330612 A1 | 6/2002 |
| CN | 101783619 A | 7/2010 |

(Continued)

OTHER PUBLICATIONS

U.S. Appl. No. 14/064,071, filed Oct. 25, 2013.
(Continued)

*Primary Examiner* — Bhavesh V Amin
(74) *Attorney, Agent, or Firm* — Davis Wright Tremaine LLP

(57) ABSTRACT

A robotic actuator comprises a mass manufactured bellows, wherein the mass manufactured bellows allows a volume change by localized bending, and wherein the mass manufactured bellows is formed from a material that has a higher strength in at least two axes relative to at most one other axis, and an end effector, wherein the end effector is coupled to the manufactured bellows.

20 Claims, 25 Drawing Sheets

Related U.S. Application Data

(60) Provisional application No. 61/719,313, filed on Oct. 26, 2012, provisional application No. 61/719,314, filed on Oct. 26, 2012.

(51) Int. Cl.

| | | |
|---|---|---|
| *F24S 50/20* | (2018.01) | |
| *F24S 50/00* | (2018.01) | |
| *F24S 30/425* | (2018.01) | |
| *F24S 23/74* | (2018.01) | |
| *F24S 30/48* | (2018.01) | |
| *F24S 30/428* | (2018.01) | |
| *F24S 30/452* | (2018.01) | |
| *F16J 3/04* | (2006.01) | |
| *H02S 20/32* | (2014.01) | |
| *F03G 6/02* | (2006.01) | |
| *H02S 40/00* | (2014.01) | |
| *B25J 9/00* | (2006.01) | |
| *F24S 30/00* | (2018.01) | |

(52) U.S. Cl.
CPC ...... *F24S 2030/115* (2018.05); *F24S 2050/25* (2018.05); *Y02E 10/40* (2013.01); *Y02E 10/46* (2013.01); *Y02E 10/47* (2013.01); *Y10S 901/22* (2013.01)

(56) References Cited

U.S. PATENT DOCUMENTS

| | | |
|---|---|---|
| 3,284,964 A | 11/1966 | Norio |
| 3,472,062 A | 10/1969 | Owen |
| 3,602,047 A | 8/1971 | Kistler |
| 3,800,398 A | 4/1974 | Harrington, Jr. |
| 3,956,543 A | 5/1976 | Stangeland |
| 3,982,526 A | 9/1976 | Barak |
| 4,063,543 A | 12/1977 | Hedger |
| 4,102,326 A | 7/1978 | Sommer |
| 4,120,635 A | 10/1978 | Langecker |
| 4,154,221 A | 5/1979 | Nelson |
| 4,172,443 A | 10/1979 | Sommer |
| 4,175,540 A | 11/1979 | Roantree et al. |
| 4,185,615 A | 1/1980 | Bottum |
| 4,198,954 A | 4/1980 | Meijer |
| 4,345,582 A | 8/1982 | Aharon |
| 4,424,802 A | 1/1984 | Winders |
| 4,459,972 A | 7/1984 | Moore |
| 4,464,980 A * | 8/1984 | Yoshida .................. B29C 49/48 264/506 |
| 4,494,417 A | 1/1985 | Larson et al. |
| 4,566,432 A | 1/1986 | Sobczak et al. |
| 4,620,771 A | 11/1986 | Dominguez |
| 4,751,868 A | 6/1988 | Paynter |
| 4,768,871 A | 9/1988 | Mittelhauser et al. |
| 4,777,868 A | 10/1988 | Larsson |
| 4,784,042 A * | 11/1988 | Paynter .................... B25J 9/142 414/7 |
| 4,832,001 A | 5/1989 | Baer |
| 4,848,179 A * | 7/1989 | Ubhayakar ................ B25J 9/06 74/490.04 |
| 4,900,218 A * | 2/1990 | Sutherland ............... B25J 18/06 254/93 HP |
| 4,939,982 A | 7/1990 | Immega et al. |
| 4,954,952 A | 9/1990 | Ubhayakar et al. |
| 4,977,790 A | 12/1990 | Nishi et al. |
| 5,021,798 A | 6/1991 | Ubhayakar |
| 5,040,452 A | 8/1991 | Van Kerkvoort |
| 5,080,000 A | 1/1992 | Bubic et al. |
| 5,156,081 A | 10/1992 | Suzumori |
| 5,181,452 A * | 1/1993 | Immega .................. B25J 9/104 91/418 |
| 5,251,538 A * | 10/1993 | Smith ....................... F16J 3/06 92/34 |
| 5,317,952 A * | 6/1994 | Immega .................. B25J 9/104 74/490.04 |
| 5,337,732 A * | 8/1994 | Grundfest .......... A61B 1/00082 600/116 |
| 5,386,741 A * | 2/1995 | Rennex .................. A61M 25/01 15/104.33 |
| 5,469,756 A * | 11/1995 | Feiten ...................... B25J 15/12 74/490.05 |
| 5,697,285 A * | 12/1997 | Nappi ........................ B25J 3/04 91/519 |
| 5,816,769 A | 10/1998 | Bauer et al. |
| 6,054,529 A | 4/2000 | O'Donnell et al. |
| 6,080,927 A | 6/2000 | Johnson |
| 6,178,872 B1 * | 1/2001 | Schulz ..................... B25J 9/142 92/92 |
| 6,557,804 B1 | 5/2003 | Carroll |
| 6,772,673 B2 * | 8/2004 | Seto ........................ B25J 9/142 92/92 |
| 6,875,170 B2 | 4/2005 | Francois et al. |
| 7,331,273 B2 | 2/2008 | Kerekes et al. |
| 7,531,741 B1 | 5/2009 | Melton et al. |
| 7,614,615 B2 | 11/2009 | Egolf |
| 8,201,473 B2 * | 6/2012 | Knoll .................. A61B 1/00156 74/490.05 |
| 8,305,736 B2 | 11/2012 | Yee et al. |
| 8,657,271 B2 | 2/2014 | Szekely et al. |
| 8,700,215 B2 | 4/2014 | Komatsu et al. |
| 8,863,608 B2 | 10/2014 | Fischer et al. |
| 8,899,359 B1 * | 12/2014 | Hafenrichter ............ B25J 5/007 180/7.1 |
| 9,133,864 B2 * | 9/2015 | Menon ..................... B25J 9/142 |
| 9,624,911 B1 * | 4/2017 | Griffith .................. F24S 50/00 |
| 9,919,434 B1 | 3/2018 | Rey et al. |
| 10,135,388 B2 * | 11/2018 | Madrone ................ H02S 20/30 |
| 10,562,180 B2 * | 2/2020 | Telleria .................... B25J 18/06 |
| 2005/0034752 A1 | 2/2005 | Gross et al. |
| 2006/0049195 A1 | 3/2006 | Koussios et al. |
| 2009/0097994 A1 | 4/2009 | Beck et al. |
| 2009/0115292 A1 | 5/2009 | Ueda et al. |
| 2009/0151775 A1 | 6/2009 | Pietrzak |
| 2009/0314119 A1 * | 12/2009 | Knoll ........................ B25J 9/06 74/490.01 |
| 2010/0043776 A1 | 2/2010 | Gee |
| 2010/0125401 A1 | 5/2010 | Hamama et al. |
| 2011/0073161 A1 | 3/2011 | Scanlon |
| 2011/0114080 A1 | 5/2011 | Childers et al. |
| 2012/0210818 A1 * | 8/2012 | Fischer .................... B25J 18/06 74/490.04 |
| 2012/0285509 A1 | 11/2012 | Surganov |
| 2013/0247962 A1 | 9/2013 | Sakai et al. |
| 2015/0244309 A1 | 8/2015 | Sakai et al. |
| 2017/0184327 A1 | 6/2017 | Griffith et al. |
| 2017/0282360 A1 * | 10/2017 | Telleria .................... B25J 18/06 |

FOREIGN PATENT DOCUMENTS

| | | |
|---|---|---|
| CN | 103222067 A | 7/2013 |
| CN | 103786165 A | 5/2014 |
| CO | 6180473 A2 | 7/2010 |
| CO | 6450667 A2 | 5/2012 |
| EP | 2648226 A1 | 10/2013 |
| FR | 2603228 A1 | 3/1988 |
| KR | 101034478 B1 | 5/2011 |
| KR | 20130019502 A | 2/2013 |
| RU | 2516595 C2 | 5/2014 |
| RU | 2611571 C1 | 2/2017 |
| SU | 1346918 A1 | 10/1987 |
| WO | 2001017731 A1 | 3/2001 |
| WO | 2011094084 A2 | 8/2011 |
| WO | 12015378 A1 | 2/2012 |
| WO | 2016123592 A1 | 8/2016 |

OTHER PUBLICATIONS

U.S. Appl. No. 14/064,072, filed Oct. 25, 2013.
U.S. Appl. No. 15/472,740, filed Mar. 29, 2017.
U.S. Appl. No. 13/557,521, filed Jul. 25, 2012.

(56) References Cited

OTHER PUBLICATIONS

U.S. Appl. No. 15/012,715, filed Feb. 1, 2016.
U.S. Appl. No. 16/134,844, filed Sep. 18, 2018.
U.S. Appl. No. 14/064,070, filed Oct. 25, 2013.
U.S. Appl. No. 15/456,347, filed Mar. 10, 2017.
U.S. Appl. No. 16/506,833, filed Jul. 9, 2019.
U.S. Appl. No. 15/955,044, filed Apr. 17, 2018.
U.S. Appl. No. 15/955,506, filed Apr. 17, 2018.
U.S. Appl. No. 15/955,519, filed Apr. 17, 2018.
U.S. Appl. No. 16/423,899, filed May 28, 2019.
Author Unkown, http://www.utilityscalesolar.com/Utility_Scale_Solar,_Inc./USS_Homepage.html, Utility Scale Solar, Inc., 2011.
International Search Report and Written Opinion dated Aug. 14, 2017, International Patent Application No. PCT/US2017/024730, filed Mar. 29, 2017.
International Search Report and Written Opinion dated Aug. 2, 2018, International Patent Application No. PCT/US2018/028020, filed Apr. 17, 2018, 7 pages.
International Search Report and Written Opinion dated Aug. 2, 2018, International Patent Application No. PCT/US2018/028024, filed Apr. 17, 2018, 7 pages.
International Search Report and Written Opinion dated Aug. 29, 2019, Patent Application No. PCT/US2019/034202, filed May 28, 2019, 7 pages.
International Search Report and Written Opinion dated Aug. 9, 2018, International Patent Application No. PCT/US2018/028025, filed Apr. 17, 2018, 7 pages.
International Search Report and Written Opinion dated May 5, 2016, International Patent Application No. PCT/US2016/015857, filed Jan. 30, 2016.
Seba, "Solar Trillions," pp. 246-250, Jan. 28, 2010.
The Wiley Encyclopedia of Packaging Technology 3rd Ed., Wiley Publications, p. 145, Sep. 2009.

* cited by examiner

US 10,875,197 B2

ROBOTIC ACTUATOR

CROSS REFERENCE TO OTHER APPLICATIONS

This application is a continuation of U.S. patent application Ser. No. 14/064,071 entitled ROBOTIC ACTUATOR filed Oct. 25, 2013 which is incorporated herein by reference for all purposes.

U.S. patent application Ser. No. 14/064,071 claims priority to U.S. Provisional Patent Application No. 61/719,313 entitled FLUIDIC SOLAR ACTUATION filed Oct. 26, 2012 and to U.S. Provisional Patent Application No. 61/719,314 entitled BELLOW ROBOT filed Oct. 26, 2012 each of which is incorporated herein by reference for all purposes.

GOVERNMENT RIGHTS STATEMENT

This invention was made with Government support under contract number W911QX-12-C-0096, awarded by the U.S. Army Contracting Command—Aberdeen Proving Ground (ACC-APG) for the Defense Advanced Research Projects Agency (DARPA). The Government has certain rights in the invention.

BACKGROUND OF THE INVENTION

There are a variety of bellows-based actuation techniques in the world today. Typically, they are constructed out of elastomeric materials and cannot hold high pressures or apply large forces relative to their weight. The few bellows that have been used as actuators either use excessive elastomeric materials in order to carry large forces or combine elastomeric material with tensile fibers that create contractile movement as more fluid is added to the chamber. McKibben actuators, for example, have a contractile reaction to increased volume (input of fluid causing an increase in cross sectional area). These actuators have poor range of motion, poor force profiles, and are expensive and heavy.

BRIEF DESCRIPTION OF THE DRAWINGS

Various embodiments of the invention are disclosed in the following detailed description and the accompanying drawings.

DETAILED DESCRIPTION

Figure 1:
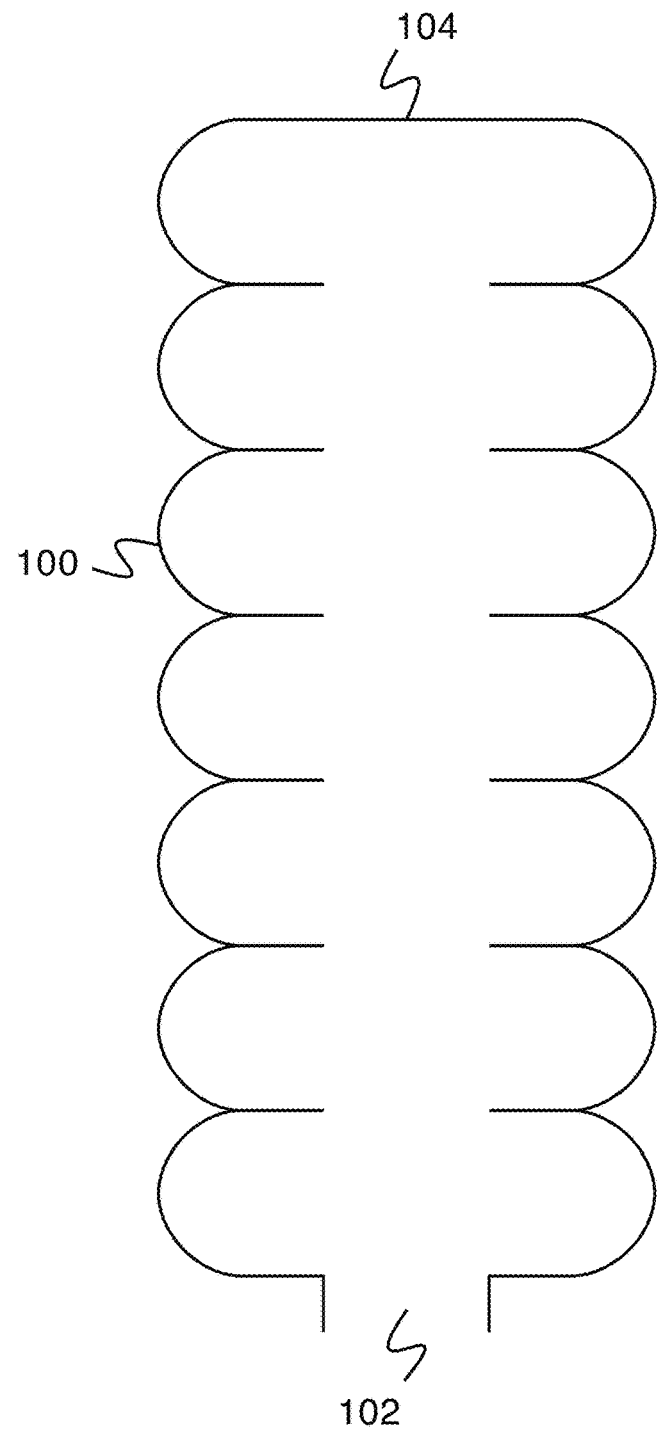
FIG. 1 is a diagram illustrating a cross section of an embodiment of a fluidic actuator.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic actuator is disclosed. A robotic actuator comprises a mass manufactured bellows, wherein the mass manufactured bellows allows a volume change by localized bending, and wherein the mass manufactured bellows is formed from a material that has a higher strength in at least two axes relative to at most one other axis, and an end effector, wherein the end effector is coupled to the manufactured bellows.

Robot designs based on fluidic actuators are disclosed. The robot designs are based on serial linkage and stacked configurations of bellows actuators to create serial manipulators. Each fluidic actuator can have its position, force, and stiffness individually controlled by intake and exhaust of pressurized fluid to and from the bellows. One or more devices for sensing or interaction with external objects (e.g., end effectors) can be placed at the end of each serial manipulator. In various embodiments, end effectors comprise pneumatic bellows in the form of a claw or gripper to manipulate, pick up, grab, rotate, pull on, move, or activate external objects; cameras for perceiving the local environment or inspecting external objects; touch or pressure sensors for tactile sensing and feedback of the local environment or external objects; or any other appropriate sensor or actuator end effectors. The goal or reason behind using many actuators (e.g., a serial stack of actuators to make a serial manipulator) is to create an arm capable of accessing a large workspace while exhibiting diverse dynamic properties. The serial manipulator is able to achieve a large range of motion including the ability to simultaneously track a six degree of freedom trajectory (e.g., each of orientation and position in three dimensions) at the end effector. Redundancy gives the manipulator flexibility in configuration when following a trajectory or applying a force—for instance, in the event the manipulator needs to take an alternate path to avoid objects in cluttered environments.

In some embodiments, the manipulator includes networked embedded nodes with sensing and computational ability, placed with each fluidic actuator to estimate the manipulator state and execute control. Sensors (e.g., comprising position sensors, orientation sensors, pressure sensors, temperature sensors, flow rate sensors, volume sensors, or any other appropriate sensors) can be placed on each of the actuators to estimate the state of the serial linkage. In some embodiments, a microcontroller resides on the actuator. In various embodiments, the microcontroller processes sensing signals, calculates valve commands, executes feedback control loops, communicates with other actuator sensors, communicates with a host computer, or performs any other appropriate communication or control task. In various embodiments, valves and sensing may or may not be collocated with the actuator and placed on board or off board the robot. In some embodiments, sensory and valve command information is communicated between the nodes of the manipulator. Coordinated control of pressure, position, or stiffness at each actuator using knowledge of the entire serial linkage can be used to control movement of the manipulator, position of the manipulator, configuration of the manipulator, or force applied between the manipulator and external objects or the environment.

In some embodiments, the body of the manipulator including space outside the fluidic actuators and the links connecting the actuators are filled with pressurized air. Filling the body of the manipulator with pressurized air puts the linkage material in tension and prevents material buckling allowing the use of thinner actuator walls. The body of the robot then acts as the high and low pressure reservoirs and provides accumulation and fluid transport for the pressurized fluid system.

In some embodiments, the manipulator comprises a bellows actuator based claw (e.g., gripper) end effector. In some embodiments, multiple single chamber one degree of freedom actuators are used as fingers to create a claw. In some embodiments, a single chamber one degree of freedom actuator stacked on top of a two chamber two degree of freedom actuator is used to create a full three degree of freedom finger. In some embodiments, tactile skin sensors are placed on the finger to provide feedback during interactions with objects and facilitate perception, grasping, and force application.

In some embodiments, serial chains of fluidic actuators are connected to a torso to create a robot with limbs. A variety of configurations are possible. In various embodiments, the robot mimics humans, animals, plants, or any other appropriate living thing and its behaviors. In various embodiments, one or more limbs are attached to the torso for grasping, manipulation, gesturing, locomoting, hopping, lifting, or to create any other appropriate action. In some embodiments, multiple limbs are controlled in coordination to complete tasks—for example, locomotion. In some embodiments, communication between the limbs or through a central host that commands the limbs can be used to coordinate movement, position, or force application.

A variety of uses for a fluidic actuator based manipulator and/or robot are possible. In some embodiments, a manipulator is placed on an autonomous or remotely operated vehicle that is used to search for, detect, and defuse or counter explosive devices. Cameras and/or grippers are placed at the end for both inspection and manipulation. In some embodiments, a manipulator is used in manufacturing or assembly (e.g., to pick up, place, sort, move, organize, or assemble parts). In some embodiments, a mobile limbed robot locomotes or moves using coordinated manipulators. In some embodiments, a manipulator is used for painting, wherein paint is plumbed to an end effector and applied to an external object. In some embodiments, cameras are used to ensure even paint distribution. In some embodiments, the manipulator reaches around obstructions or aims in many directions to fully paint complex objects. In some embodiments, a manipulator is used to wash windows. The manipulator is capable of applying regulated force to the surface of the window to remove debris without damaging the window. The lightweight nature of the arm allows it to be easily lifted (e.g., to reach high windows). In some embodiments, a manipulator is used in construction to lift heavy objects or dig holes (e.g., similar to heavy machinery, for instance a backhoe). In some embodiments, a manipulator is filled with water and used under the ocean to perform inspection and manipulation tasks. A water filled robot is neutrally buoyant allowing it to operate at any depth. In various embodiments, a manipulator assists in agricultural tasks including harvesting, pruning, weed eradication and thinning, animal husbandry, cow milking, sheep shearing, meat processing, or any other appropriate agricultural tasks. In some embodiments, a manipulator is used for construction. In some embodiments, a manipulator is used in dishwashing or other wet environments not suited to traditional (e.g., rust prone) robots. In some embodiments, a manipulator is used for food preparation. In some embodiments, a manipulator is used for gardening and landscaping. In some embodiments the fluidic actuators are interfaced with the human body to provide assistance to human movement, force application, or structure as a prosthetic, orthotic, or exoskeleton device.

A fluidic actuator is disclosed. A fluidic actuator comprises a chamber, wherein the chamber is provided using a mass manufacturing technique, wherein the chamber is formed from a material that has a higher strength in at least two axes relative to at most one other axis, and wherein the chamber allows a volume change by localized bending of a chamber wall.

A fluidic actuator comprises an actuator wherein fluid pressure or volume is used to create either force or movement or position. The actuator geometry and fluid pressure or fluid volume are used instead of or in conjunction with the material properties of the actuator to provide positioning, movement, and strength. The actuator comprises one or more sealed fluidic chambers that respond to changes in fluid pressure or fluid volume, rather than using sliding seals to allow actuation. Pressurized volume change, and thereby mechanical work, is achieved through deformation of a thin walled pressure vessel, not through movement of a sliding contact seal along a surface. This allows for hermetic sealing (the elimination of seal leakage pathways), the elimination of seal friction, the elimination of seal wear, and the elimination of constant geometry high tolerance surfaces capable of sustaining an effective moving seal. The actuators described may either be made from a material that is inherently air or liquid tight, or may include a separate open-volume actuator with an internal or integrated bladder. Volume change is created through bellows geometry, where the term bellows is considered in its broadest definition to cover any variable volume continuous surface pressure vessel. The geometry is ideally optimized to enable compliance in the desired degrees of freedom and relative stiffness and/or strength along non-desired degrees of freedom. Bellows inspired actuators can be created where volume change is created through anisotropic material properties. For example, material, e.g., cloth, could be woven into a tube such that the axial direction has large compliance, but the hoop (circumferential) direction is very stiff. Very high strength or stiffness materials can be formed into actuators with very thin walls that can bend and create volume change while being highly resistant to stretching and able to carry high loads.

The design of the actuator includes creating shapes such that bending takes place in the appropriate locations (e.g., in a chamber wall). The compliance properties of the chamber of the actuator and its ability to deform under pressure is created through the geometry of the design rather than the elastic properties of the material. Distributed localized buckling creation of a chamber wall can be used to control large scale buckling behavior. Bellows inspired actuators can additionally be created where a volume change is created through the deflection of one or more convolutions or one or more levels of convolutions—for example, longitudinal or hoop convolutions, or convolutions forming ribs along a larger doughnut shaped convolution. In various embodiments, convolutions are additionally non-uniform, discontinuous, asymmetric in order to make complex motions possible (e.g., an actuator that creates a motion simulating a human finger), or have any other appropriate properties. In various embodiments, the shape of the convolutions, the number of the convolutions and the wall thickness are designed based on the expected load, the desired range of motion, pressure, or operating characteristics, or any other design criteria.

The fluidic actuator is formed using a mass manufacturing technique. For example by blow molding, injection molding, rotational molding, 3-Dimensional (3D) printing, or extrusion or any other appropriate mass manufacturing or high volume manufacturing technique. In some embodiments, the blow molding of the actuator uses plastic—for example, a thermoplastic/thermopolymer. In various embodiments, the thermoplastic for blow molding comprises acrylonitrile butadiene styrene (ABS), poly vinyl chloride (PVC), polyethylene terephthalate glycol (PETG), polyethylene terephthalate (PET). Polycarbonate, Thermoplastic Elastomers, Polyethylene (high density PE (HDPE), low density PE (LDPE), linear low density PE (LLDPE), ultra high molecular weight PE (UHMWPE)), Polypropylene (Homopolymer and Copolymer), Polystyrene, Polysulfone, Acetal, Nylon, polybutylene terphthalate (PBT), polyetheretherketone (PEEK), polytetrafluoroethylene (PTFE), polyphenylene sulfide (PPS), polyvinylidene fluoride (PVDF) or any other appropriate plastic. In some embodiments, the plastic comprises a thermoset plastic. In various embodiments, the thermoset comprises one of the following: silicone, epoxy, polyester, polyimide, latex, polyurethane, natural rubbers, vinyl, or any other appropriate thermoset plastic. Blow molding a plastic has the advantage that polymer chains are aligned during the blow molding process, with the effect of strengthening and stiffening the material. Plastic is a cheap material to mass manufacture, and a large volume of parts can be made from a single mold. In some embodiments, fibers are added to the plastic material to improve material strength and stiffness and to enable greater control over anisotropic properties. During design of the fluidic actuator, the blow molding process is considered in order to ensure that the actuator is amenable to blow molded manufacturing. In some embodiments, a multi-stage blow molding process is used to apply one or more coatings—for example, an aluminized Mylar film for improving UV resistance, fluid impermeability, temperature and chemical resistance, resistance to abrasion, etc. In some embodiments, the blow molding process directly creates an airtight chamber that is used for both structural strength and for containing fluid. In some embodiments, the mass manufacturing technique (e.g., blow molding) creates a single material structure for the fluidic actuator. In some embodiments, the design of a convolution of the fluidic actuator is for a blow molding manufacturing process. In some embodiments, the fluidic actuator is comprised of a composite material. A composite material is a material comprising several distinct materials that remain distinct in the final product (e.g., carbon fiber, plywood, concrete, etc.). Constituent materials are chosen to provide specific properties (e.g., strength, impermeability, resistance to corrosion, etc.) to the aggregate which cannot be achieved using a single material.

In some embodiments, in the case of weight sensitive applications, specific strength is the metric of concern. That is, the working stress of the material divided by its density. In the case of cost sensitive applications, cost per strength is the significant metric of concern, that is, the specific strength divided by the cost per mass—the mass terms wash out. As this infers, strength to weight ratio can have a strong bearing on cost, the stronger a material is the less of it is required and so the lower the system cost can be. PET is particularly interesting because it is a low cost low density material that when elongated can achieve comparatively high strengths—it has a very good cost to strength ratio, in addition to very significant low cost manufacturing advantages.

In some embodiments, there are some cases where stiffness is a concern, for example, when trying to do precise control (e.g., in the case of precise open loop CNC machine type operations) as opposed to just applying large forces (e.g., in the case of lifting heavy objects). In some embodiments, in the realm of a high force situation—for example, when using a highly compressible gas material, stiffness is not typically significant to overall stiffness. In the hydraulic case, where the fluid is largely in-compressible, the material stiffness (as opposed to the material strength), is more significant. In some embodiment, it is desirable to ignore material stiffness, except that the elastic range of the actuator needs to be tuned, whether by geometry or material properties, to the desired range of motion of the actuator in the axis of actuator motion. In some embodiments, in the axis, for example, the hoop direction, it is desirable to just build the cheapest pressure vessel possible—good cost to strength material properties.

In some embodiments, when high strength is discussed, this is defined as use of significant anisotropic material properties, for example, the use of wire rope or fibers, or, the use of significant polymer alignment along the desired direction. For example, by using elongated PET (e.g., the blow molding process stretches and aligns the polymers within the material, achieving far higher strengths along the axis of stretching than injection molding alone), the strength is greatly increased and the mass/cost is reduced in that axis of stretch. In some embodiments, in the case of a cylindrical pressure vessel, which closely relates to a bellows, ideally it is desired to have twice as much strength in the hoop direction as in the axial direction. In the event that maximizing the strength in the hoop direction and axial direction (the former needing to be twice the latter) and not caring about strength in the wall thickness direction, the material properties should be biased to match, whether this is by specific directional fiber addition and orientation, or careful control of a manufacturing process (e.g., blow molding process) to stretch the preform in those directions. This process gets more complicated when applied to a bellows as there are optimizations/trade offs between hoop and axial strength where it is possible to in some cases "swap" one for the other. Point being anisotropic properties of the bellows material ideally wants to be tuned to the bellows profile and range of motion requirements. For cost control purposes, it is desirable to apply material strength to the desired material axis and not waste material strength on an axis or axes that are not critical to the capacity of the bellows to hold pressure and exert force over the desired range of motion.

In some embodiments, therefore strength is perhaps about maximization of chemical bond strength in those directions that are optimal for a thin wall pressure vessel—exploiting anisotropic properties, and not wasting bond strength in non-desired directions (e.g., like in the direction of wall thickness). In some embodiments, it is also, in the plastic case, about aligning polymers for maximum strength, and not leaving them in a spaghetti-like state as in an injection molded/extruded/cast state. Note that bellows convolutions are a way of varying these same anisotropic properties through gross geometry while still using high strength aligned polymers, for example, adding compliance in the axial direction while maximizing strength in the hoop direction and axially along the convolution profile.

In some embodiments, flexibility is about increasing compliance in the desired axis of range of motion—allowing the bellows to extend and thereby do work. Generally, but not always, extending and "doing work" in any other axis than the one desired is undesirable.

In various embodiments, actuator motion is constrained using multiple different techniques, including adding a spine, linkage, flexure spine, or other stiff element to the fluidic actuator, connecting multiple fluidic actuators using a coupling element, or other mechanism, or any other appropriate manner of constraint. In some embodiments, force is transferred and movement is defined through a spine, flexure spine, or linkage. In various embodiments, a linkage, flexible structure, spine, flexure spine, or membrane is used to convert either chamber movement or force into joint movement or force. In various embodiments, multiple chambers and either a linkage, flexure spine, spine, or a flexible structure are made from a single piece of material. In some embodiments, the constraining flexure elements comprise significantly elastomeric materials to enable a range of motion and are reinforced with flexible high strength fibers to enable great overall strength.

In various embodiments, configurations using 1, 2, 3, 4, or any other appropriate number of actuators are used for applications. In some embodiments, multiple chambers are placed antagonistically so that pressurized fluid is used to create opposing force and regulate force, position, or stiffness. In various embodiments, configurations include: 1 chamber forming a 1 degree of freedom actuator, using the internal force of the deformed chamber material to return it to a neutral position; 1 chamber forming a 1 degree of freedom actuator where the volume determines a shape or a joint movement; 2 chambers forming a 1 degree of freedom antagonistic actuator; 3 or more chambers forming a 2 degree of freedom antagonistic actuator; 4 chambers forming a 2 degree of freedom actuator with stiffness control; or any other appropriate configuration. In some embodiments, the geometry is turned to enable volume and pressure, and thereby work, to vary non-linearly with extension so as to enable nonlinear variable force actuation. For example, a blow molded finger actuator might be geometrically tuned to be very strong when tightly grasping but less strong when pointing straight.

In various embodiments, techniques exist for activation and control of a blow molded fluidic actuator. Fluid movement is generally facilitated by a compressed gas or pressurized liquid source. In various embodiments, the flow in and out of chambers is either directed by valves or by pumps, or any other appropriate flow control. In some embodiments, actuator position or force is controlled by sensing any combination of position, velocity, volume flow rate to/from each chamber, mass flow rate into and out of each chamber, and fluid properties in each chamber (e.g., temperature, pressure, volume), and determining control signals from the measured signals to close a feedback loop. In some embodiments, feedback computations are done either through analog hardware (e.g., electronics, mechanisms) or by using a digital computing system. For example, sensors in a feedback control loop comprise one or more of the following: inertial measurement units, magnetometers, gyroscopes, accelerometers, pressure transducers, thermocouples, thermistors, flex sensors, etc. In various embodiments, specific geometries or linkages or flexure spines are constructed that enable position to be controlled solely based on pressure ratio, for instance by designing a nonlinear chamber volume to joint position relationship. In some embodiments, for actuators that enable position to be controlled solely based on pressure ratio, the actuators exhibit a special property where actuator stiffness is actively tuned either instead of or in addition to other controls.

The fluidic actuator comprises a chamber—for example, a sealed chamber for holding a fluid (e.g., a gas or a liquid). The chamber allows a volume change by bending (e.g., the internal volume of the sealed chamber changes as the chamber walls bend). The amount of fluid that is held by the sealed chamber changes as the walls bend. In some embodiments, changing the volume of fluid stored in the chamber causes the walls to bend. In some embodiments, the chamber comprises a bellows. In some embodiments, the bellows create deflection (e.g., bending). In some embodiments, the bellows comprise convolutions (e.g., folds, ridges, etc.). In some embodiments, in the event fluid is added to or removed from the chamber, one or more convolutions of the chamber deflect.

In some embodiments, the fluidic actuator comprises a bellows-based actuator including a novel use of convolutions to design elastic and non-elastic regions in a single, homogenous material instead of using multiple materials or complicated processing. A monolithic inexpensive process such as blow molding or injection molding is used for production of the fluidic actuator. In some embodiments, the fluidic actuator comprises convolutions in axial, radial, or both directions enabling the stiffness, accuracy, and overall range of motion to be tunable via geometry instead of solely from the key material properties (e.g., modulus of elasticity) and material thickness. In some embodiments, the fluidic actuator comprises deterministic position control based on antagonistic actuation, with either volume or pressure as the control using a fluidic medium such as liquid or air. Volume and pressure controlled systems have different geometries and requirements. The fluidic actuator is able to achieve a large range of motion (e.g., bending more than 90°) with high overall stiffness and high dimensional stability.

In some embodiments, the fluidic actuator comprises a stem bellows actuator. A stem bellows actuator comprises a stem shaped fluidic actuator capable of bending. In various embodiments, the stem bellows actuator comprises one chamber, two chambers, three chambers, four chambers, or any other appropriate number of chambers. In some embodiments, the chambers are configured antagonistically (e.g., the chambers push against one another in different directions). In some embodiments, the stem bellows actuator comprises a one degree of freedom actuator (e.g., the end of the actuator is capable of moving to a set of points on a curve or line). In some embodiments, the stem bellows actuator comprises a two degree of freedom actuator (e.g. the end of the actuator is capable of moving to a set of points on a surface—a flat or curved surface). In some embodiments, the stem bellows actuator comprises a three degree of freedom actuator (e.g. the end of the actuator is capable of moving to a set of points within a volume or the end of the actuator is capable of moving on a curved surface while twisting for the third degree of freedom).

In some embodiments, the fluidic actuator additionally comprises a spine, flexure spine, or a linkage (e.g., a member that can bend but not lengthen or contract, a constraint between the end points of the spine, flexure spine, or linkage). In various embodiments, the spine, flexure spine, or linkage is integrated with the chamber (e.g., formed as part of the chamber during the blow molding process) or connected to the chamber (e.g., formed separately from the chamber, potentially of a different material, and connected to the chamber in an assembly step). In some embodiments, the fluidic actuator comprises a variable stiffness actuator (e.g., a change in pressure within the chambers can cause the actuator stiffness to change).

FIG. 1 is a diagram illustrating a cross section of an embodiment of a fluidic actuator. In some embodiments, the fluidic actuator of FIG. 1 comprises a stem fluidic actuator. In the example shown, chamber 100 comprises a one degree of freedom stem bellows actuator shown in cross section. Chamber 100 in three dimensions comprises cross section shown in FIG. 1 rotated around the axis of symmetry. Chamber 100 comprises a fluid-tight chamber formed by a mass manufacturing process—for example, blow molding, injection molding, rotational molding, 3D printing, or extrusion. Chamber 100 comprises port 102. In some embodiments, port 102 comprises a port for allowing a fluid to pass into and out of chamber 100. In some embodiments, port 102 is connected to a fluid supply (e.g., a compressor, a pump, a tank, etc.). In some embodiments, one or more fluid control devices is/are present in between port 102 and the fluid supply (e.g., a regulator, a valve, etc.). In various embodiments, a fluid supply connected to chamber 100 via port 102 controls a volume of fluid in chamber 100, a pressure of fluid in chamber 100, a temperature of a fluid in chamber 100, or any other appropriate fluid property. In some embodiments, increasing the volume of fluid in chamber 100 causes the walls of chamber 100 to bend. The convolutions (e.g., folds) in the walls unfold in order to increase the internal volume of chamber 100 and the chamber expands. In some embodiments, a chamber incorporating convolutions comprises a bellows. In some embodiments, chamber 100 comprises a bellows. In some embodiments, convolutions bend to create deflection. In some embodiments, deflection allows a volume change. In some embodiments, the convolutions are designed so that the chamber expands in a straight line when the internal pressure is increased, moving end 104 away from port 102. In some embodiments, decreasing or increasing the volume of fluid in chamber 100 causes the walls of chamber 100 to bend. The convolutions (e.g., folds) in the walls fold more in order to decrease the internal volume of chamber 100 and the chamber contracts. In some embodiments, the convolutions are designed so that the chamber contracts in a straight line when the internal volume is decreased, moving end 104 towards port 102. In some embodiments, chamber 100 is designed to have a returning force (e.g., as in a spring) for returning chamber 100 to a neutral position. In some embodiments, chamber 100 is designed not to have a returning force and to remain in the position set by the pressure or volume of fluid present in chamber 100. In some embodiments, the convolutions of chamber 100 are designed so that chamber 100 expands and contracts in a straight line. In some embodiments, the convolutions of chamber 100 are designed to that chamber 100 curves as it expands and/or contracts. In various embodiments, chamber 100 is designed to curve as it expands and/or contracts using asymmetric convolutions, nonuniform convolutions, a region where convolutions are not present, nonuniform stiffness, a spine, a flexure spine, a linkage, or any other appropriate design feature. In some embodiments, the travel of chamber 100 as it expands and/or contracts is dictated by a mechanical restraint attached to chamber 100.

In some embodiments, chamber 100 is formed from plastic using a blow molding process. In some embodiments, the plastic of chamber 100 comprises a thermoplastic. In various embodiments, the plastic of chamber 100 comprises polyethylene terephthalate, high density polyethylene, low density polyethylene, polypropylene, or any other appropriate plastic. In some embodiments, the blow molding process aligns polymer chains of the plastic. In various embodiments, aligning polymer chains of the plastic increases plastic strength, stiffness, elasticity, resistance to breakage, total lifetime, or any other appropriate parameter. In some embodiments, chamber 100 comprises a fluid impermeable layer (e.g., to hold fluid pressure within chamber 100) and a mechanically structural layer (e.g., to hold a desired shape). In some embodiments, a single material layer comprises both a fluid impermeable layer and a mechanically structural layer. In some embodiments, the fluid impermeable layer comprises an inner material layer (e.g., a fluid impermeable bladder) and the mechanically structural layer comprises an outer material layer (e.g., a fluid permeable but mechanically structural plastic layer). In some embodiments, fibers are added to the plastic of chamber 100 (e.g., to increase its strength). In some embodiments, fibers added to the plastic of chamber 100 are aligned in order to anisotropically increase its strength (e.g., to allow compliance the direction of expansion and contraction but increase strength in the perpendicular direction). In some embodiments, a fabric is added to chamber 100 (e.g., wrapped around chamber 100, glued to chamber 100) in order to increase its strength (e.g., isotropically or anisotropically). In some embodiments, chamber 100 is formed through a multiple step blow molding process (e.g., multiple blow molding steps are used to deposit multiple plastic layers). In various embodiments, plastic layers deposited during a multiple step blow molding process comprise a high strength plastic layer, a fluid impermeable plastic layer, a high elasticity plastic layer, a UV (e.g., ultraviolet light) impermeable plastic layer, a light reflective plastic layer, a light weight plastic layer, or any other appropriate plastic layer.

In some embodiments, an end effector is mounted on end 104. In various embodiments, an end effector comprises a sensor, an actuator, a gripper, a claw, a display, or any other appropriate end effector.

Figure 2:
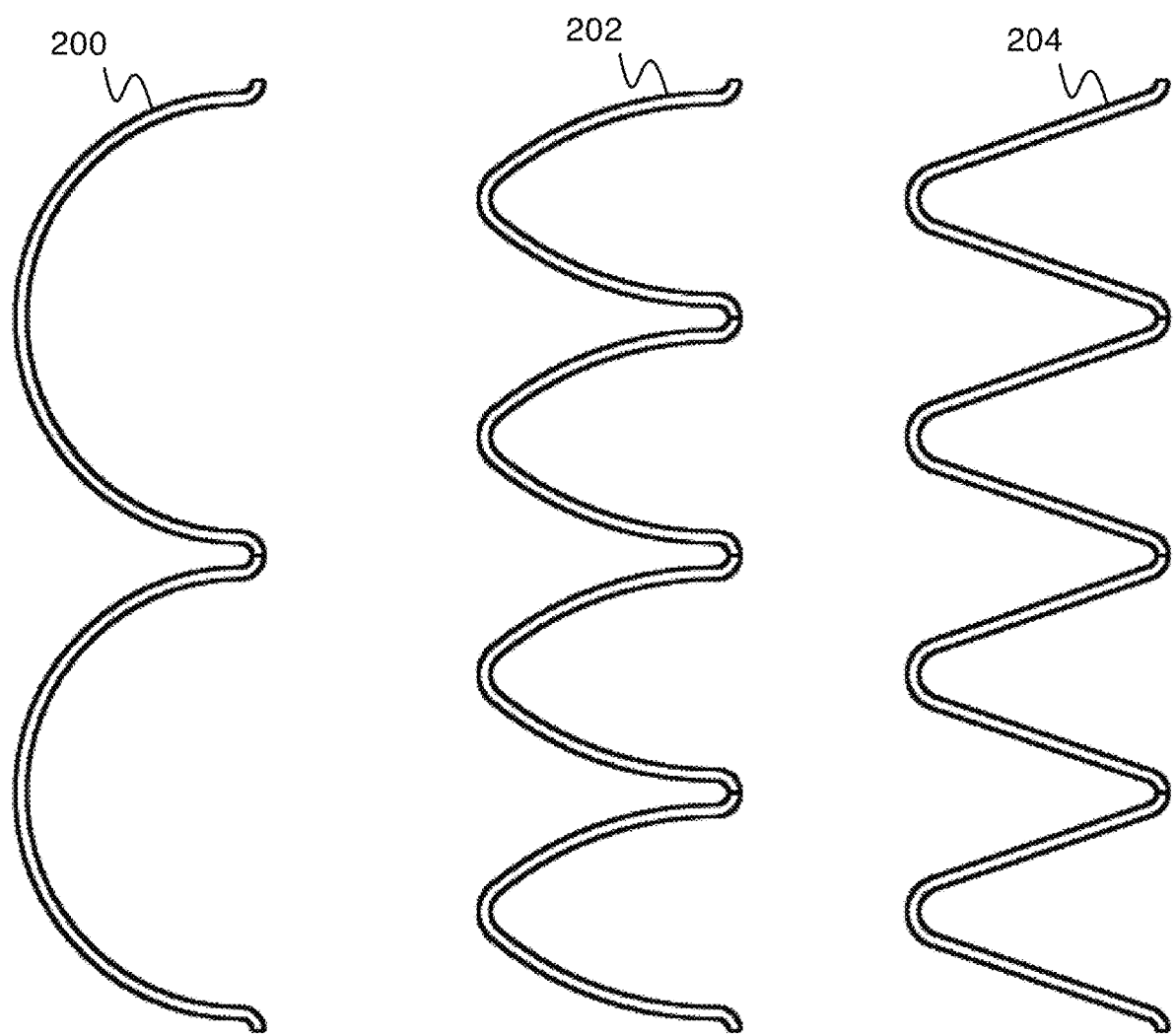
FIG. 2 is a diagram illustrating an embodiment of side wall convolutions in cross section.

FIG. 2 is a diagram illustrating an embodiment of side wall convolutions in cross section. In some embodiments, the convolutions of FIG. 2 comprise convolutions for a chamber (e.g., chamber 100 of FIG. 1) forming a bellows actuator. In the example shown, convolutions 200, convolutions 202, and convolutions 204 comprise geometries of a chamber wall (e.g., revolved to make a closed tube and repeated and for example sealed at one end with an opening at another end). Convolutions 200 comprise semicircular convolutions, convolutions 202 comprises composite waveform convolutions, and convolutions 204 comprises triangular convolutions. In various embodiments, convolutions are designed with various profiles in order to affect the bellows stiffness, elasticity, lifetime, returning force, or any other appropriate parameter. For example, composite waveform convolutions may be chosen such that internal stresses are evenly distributed throughout the material improving strength performance and while giving up range of motion. On the other hand, a triangle wave gives the maximum range of motion but at the cost of strength. Semicircular and composite waveform convolutions may be chosen such that neighboring convolutions come in contact altering the stiffness and active cross section of the fluidic actuator. In some embodiments, convolutions are spaced with sections of cylindrical tubing.

In some embodiments, a convolution profile should be designed so as to meet range of motion requirements while as closely as possible approximating an optimal thin wall pressure vessel. That is, material should ideally be operated in tension at consistent stress levels, independent of whether it be a hoop or axial stress, or in which section of the convolution the stress is. Variable wall thickness and anisotropic properties of the material might further be tuned to aid in this, for example, blow molding might stretch the preform in hoop more than axial so as through polymer alignment to increase strength in hoop and increase compliance in the axial direction, though a trade off between optimal stress levels and range of motion will ensue.

Figure 3:
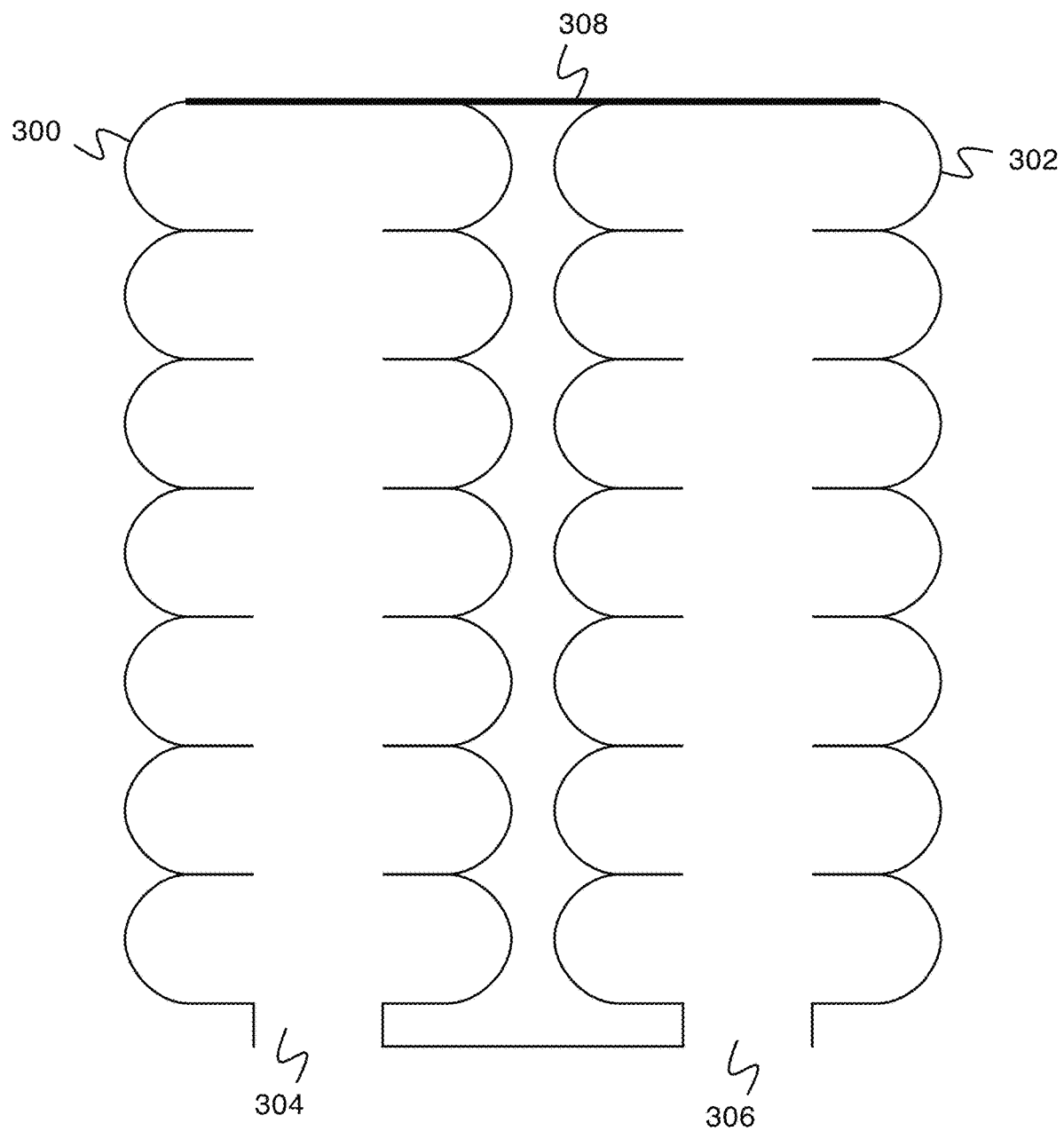
FIG. 3 is a diagram illustrating a cross section of an embodiment of a fluidic actuator.

FIG. 3 is a diagram illustrating a cross section of an embodiment of a fluidic actuator. In some embodiments, the fluidic actuator of FIG. 3 comprises a stem bellows actuator. In the example shown, each of chamber 300 and chamber 302 comprises a one degree of freedom fluidic actuator (e.g., as in chamber 100 of FIG. 1). The combination of chamber 300 and chamber 302 comprises a two degree of freedom fluidic actuator. Port 304 comprises a port for allowing fluid to enter or exit chamber 300, and port 306 comprises a port for allowing fluid to enter or exit chamber 302. Flexure spine 308 comprises a flexure spine for connecting the ends of chamber 300 and chamber 302. In some embodiments, chamber 300 and chamber 302 expand and contract in response to changes in the pressure and/or volume of stored fluid (e.g., fluid entering and exiting chamber 300 via port 304 and chamber 302 via port 306). In some embodiments, if the volumes of the fluid contained in chamber 300 and the fluid contained in chamber 302 change in the same direction (e.g., in common mode), the end of the actuator (e.g., flexure spine 308) moves straight in and out (e.g., motion similar to the motion of chamber 100 of FIG. 1). In some embodiments, if the volumes of the fluid contained in chamber 300 and the fluid contained in chamber 302 change in opposite directions (e.g., in differential mode), the end of the actuator (e.g., flexure spine 308) tilts as the actuator bends to the right or left. In some embodiments, if the volume in chamber 300 is increased and the volume in chamber 302 is decreased, the actuator bends to the right. In some embodiments, if the volume in chamber 300 is decreased and the volume in chamber 302 is increased, the actuator bends to the left. In some embodiments, a combination of common mode volume changes and differential mode volume changes is used to move the end of the actuator within the plane of the two chambers (e.g., in two dimensions). In some embodiments, an end effector is mounted on flexure spine 308.

Figure 4:
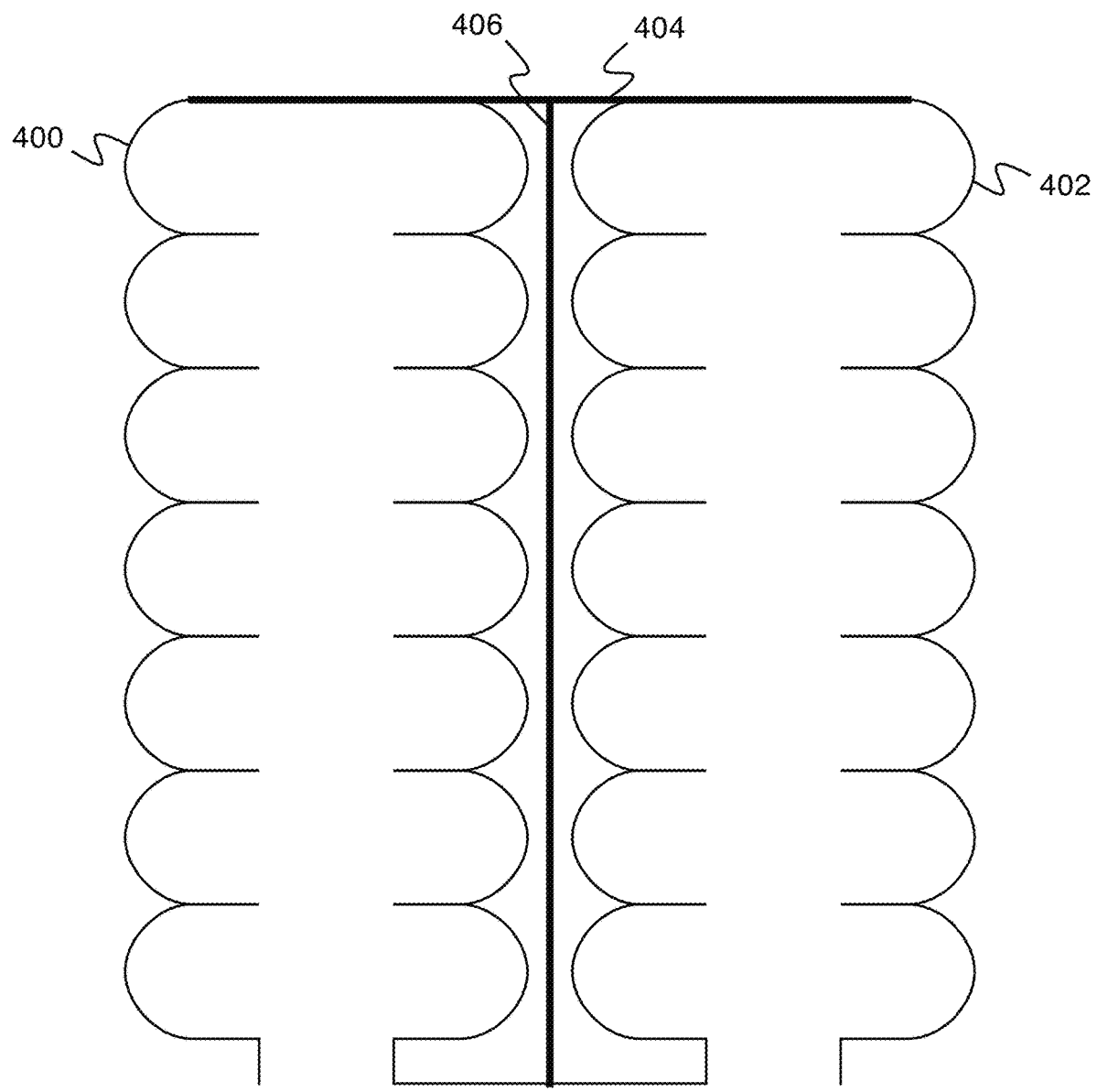
FIG. 4 is a diagram illustrating a cross section of an embodiment of a fluidic actuator.

FIG. 4 is a diagram illustrating a cross section of an embodiment of a bellows actuator. In some embodiments, the bellows actuator of FIG. 4 comprises a stem bellows actuator. In the example shown, each of chamber 400 and chamber 402 comprises a one degree of freedom stem bellows actuator (e.g., as in chamber 100 of FIG. 1). In some embodiments, the combination of chamber 400 and chamber 402 comprises a one degree of freedom stem bellows actuator. Chamber 400 and chamber 402 are connected via linkage 404 and stem 406. Stem 406 comprises a stem or flexure spine capable of bending but not extending or contracting. In the event that the internal pressure of chamber 400 and the internal pressure of chamber 402 change in opposite directions (e.g., in differential mode), the torque applied by the actuator will change, in some cases causing the actuator to bend to the left or to the right. In the event that the internal pressure of chamber 400 and the internal pressure of chamber 402 change in the same direction (e.g., in common mode), stem 406 prevents the actuator from extending or contracting. In some embodiments, in the event that the actuator is unloaded and at rest and the internal pressure of chamber 400 and the internal pressure of chamber 402 change in the same direction while maintaining a constant pressure ratio, the stiffness of the actuator changes (e.g., becomes stiffer or becomes more compliant) while the unloaded equilibrium position does not change. In some embodiments, the ratio of the internal pressure of chamber 400 and the internal pressure of chamber 402 determine a unique unloaded equilibrium position. In some embodiments, the constrained motion of the actuator is along a single curved line (e.g., in one dimension). In some embodiments, an end effector is mounted on linkage 404.

Figure 5:
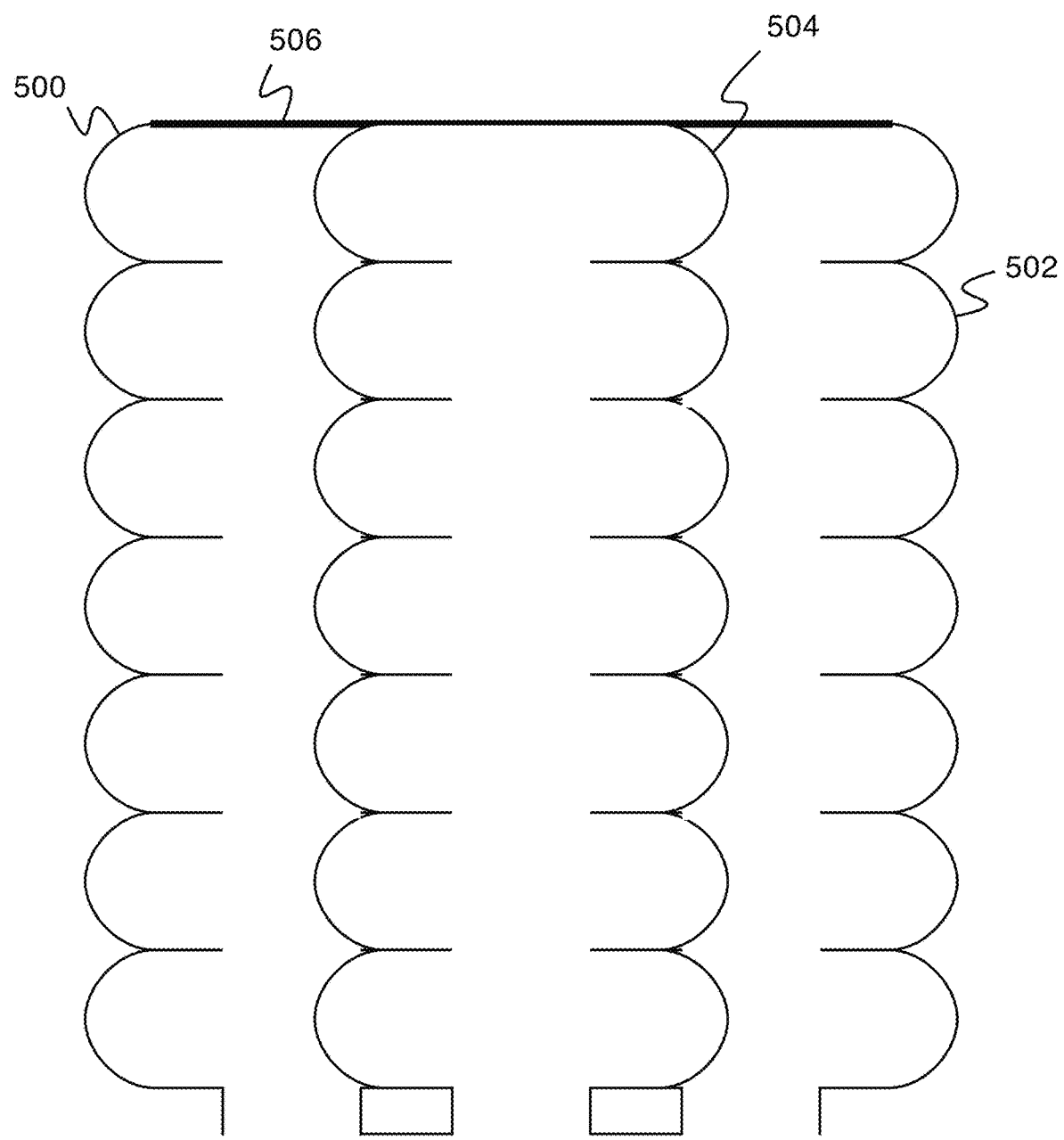
FIG. 5 is a diagram illustrating a side view of an embodiment of a fluidic actuator.

FIG. 5 is a diagram illustrating a side view of an embodiment of a fluidic actuator. In some embodiments, the fluidic actuator of FIG. 5 comprises a stem bellows actuator. In the example shown, each of chamber 500, chamber 502, and chamber 504 comprises a one degree of freedom fluidic actuator (e.g., as in chamber 100 of FIG. 1). In some embodiments, the combination of chamber 500, chamber 502, and chamber 504 comprises a three degree of freedom stem bellows actuator. In the example shown, chamber 500, chamber 502, and chamber 504 are connected via linkage 506. The central axes of chamber 500, chamber 502, and chamber 504 are located equidistant from one another (e.g., chamber 500, chamber 502, and chamber 504 form a triangle when viewed from above). In some embodiments, if the volumes of the fluid contained in chamber 500, the fluid contained in chamber 502, and the fluid contained in chamber 504 change in the same direction (e.g., in common mode), the end of the actuator (e.g., linkage 506) moves straight in and out (e.g., motion similar to the motion of chamber 100 of FIG. 1). In some embodiments, if the volumes of the fluid contained in any two of chamber 500, chamber 502, and chamber 504 change in opposite directions (e.g., in differential mode), the end of the actuator (e.g., linkage 506) tilts as the actuator bends (e.g., similar to the bending of the actuator of FIG. 3). The stem actuator is capable of bending in six different directions (e.g., two directions for each of three separate pairs of chambers). In some embodiments, a combination of common mode volume changes and differential mode volume changes is used to move the end of the actuator in three dimensions. In some embodiments, an end effector is mounted on linkage 506. Each of the chambers (e.g., chamber 500, chamber 502, and chamber 504) includes an opening for moving fluid in and out of each of the chambers.

Figure 6:
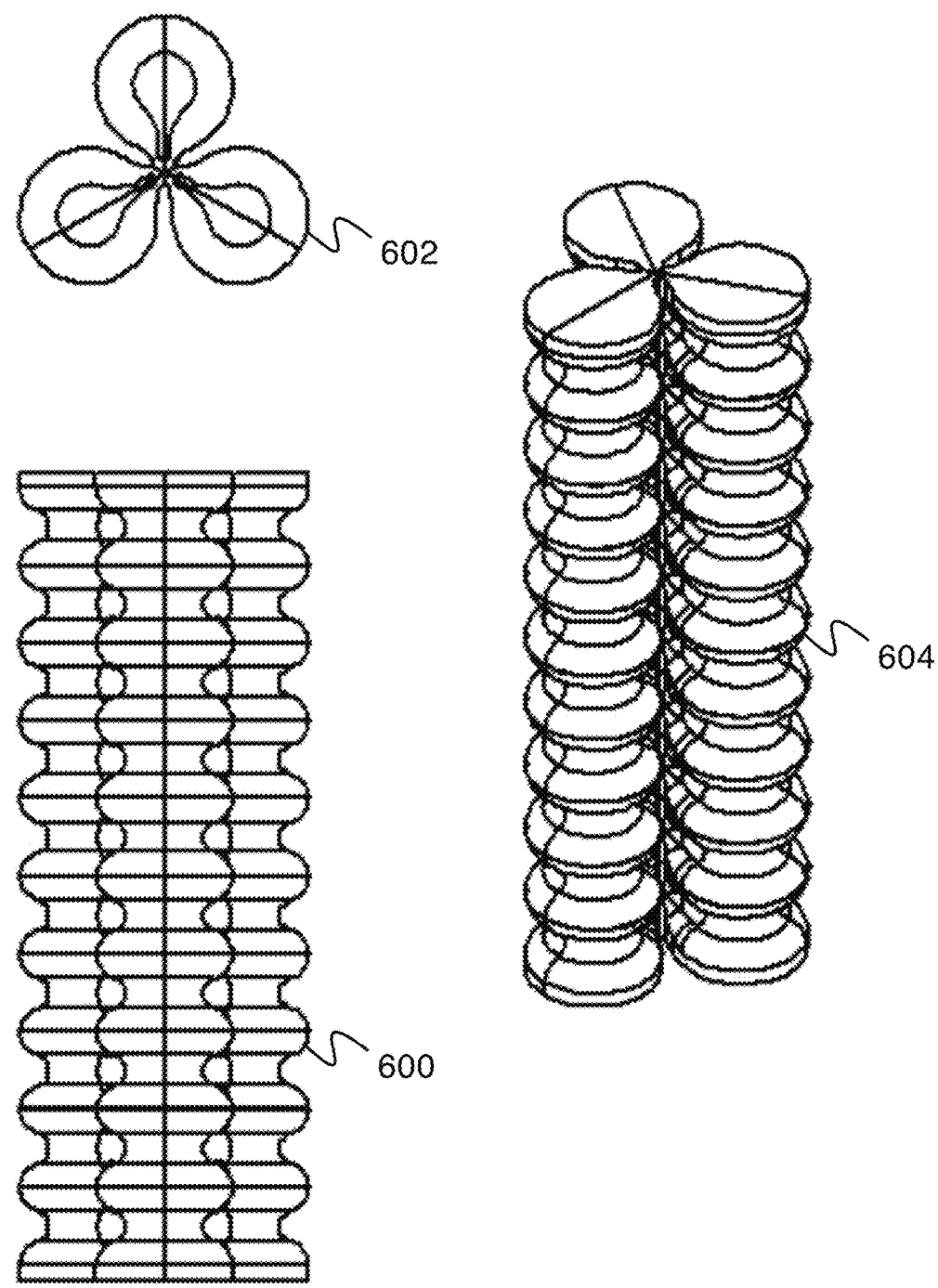
FIG. 6 is a diagram illustrating three views of a fluidic actuator.

FIG. 6 is a diagram illustrating three views of a fluidic actuator. In some embodiments, the fluidic actuator shown in FIG. 6 comprises the fluidic actuator of FIG. 5. In the example shown, fluidic actuator 600 comprises a fluidic actuator comprising three chambers shown from the front. Fluidic actuator 602 comprises a fluidic actuator comprising three chambers shown from the top. Fluidic actuator 604 comprises a fluidic actuator comprising three chambers shown in an isometric view. In some embodiments the bellows actuator in 600 is entirely formed out of a single continuous piece of material.

Figure 7:
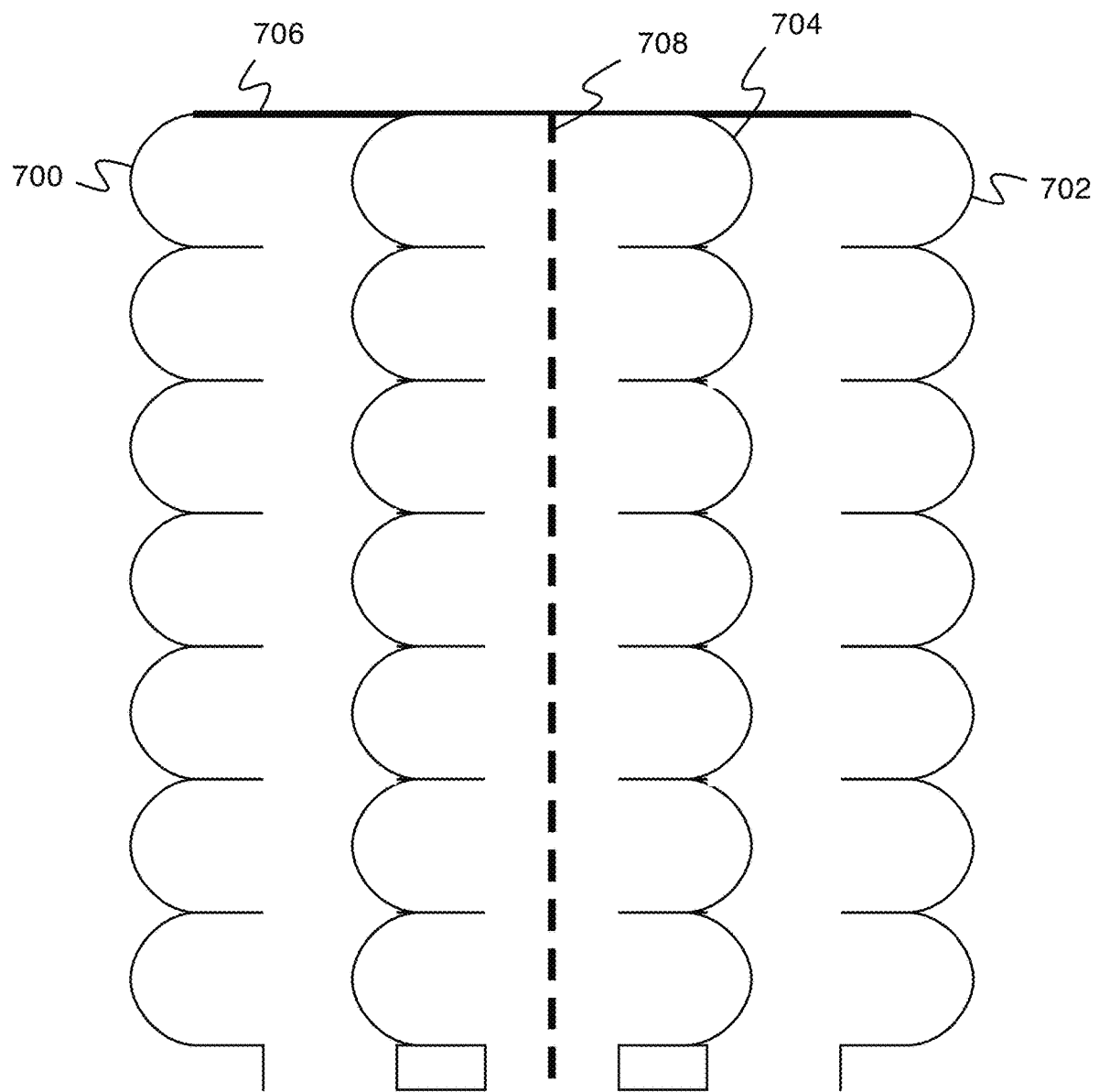
FIG. 7 is a diagram illustrating a side view of an embodiment of a fluidic actuator.

FIG. 7 is a diagram illustrating a side view of an embodiment of a fluidic actuator. In some embodiments, the fluidic actuator of FIG. 7 comprises a stem bellows actuator. In the example shown, each of chamber 700, chamber 702, and chamber 704 comprises a one degree of freedom fluidic actuator (e.g., as in chamber 100 of FIG. 1). In some embodiments, the combination of chamber 700, chamber 702, and chamber 704 comprises a two degree of freedom stem bellows actuator. In the example shown, chamber 700, chamber 702, and chamber 704 are connected via linkage 706 and stem 708. In some embodiments, stem 708 comprises a stem or flexure spine capable of bending but not extending or contracting. In some embodiments, if the internal volume of the fluid contained in any two of chamber 700, chamber 702, and chamber 704 change in opposite directions (e.g., in differential mode), the actuator will bend (e.g., similar to the bending of the actuator of FIG. 3). In some embodiments, if the internal pressure of the fluid contained in any two of chamber 700, chamber 702, and chamber 704 change in opposite directions (e.g., in differential mode), the torque applied by the actuator will change, in some cases causing the actuator to bend flexure spine (e.g., similar to the bending of the actuator of FIG. 3). In the event that the internal pressure of chamber 700, the internal pressure of chamber 702, and the internal pressure of chamber 704 change in the same direction (e.g., in common mode), stem 708 prevents the actuator from extending or contracting. In some embodiments, in the event that the internal pressure of chamber 700, the internal pressure of chamber 702, and the internal pressure of chamber 704 change in the same direction while maintaining a constant pressure ratio, the stiffness of the actuator changes. In some embodiments, the ratio of internal pressures determines a unique unloaded equilibrium position. In some embodiments, the constrained motion of the actuator is along a single curved surface (e.g., in two dimensions). In some embodiments, an end effector is mounted on linkage 706.

Figure 8:
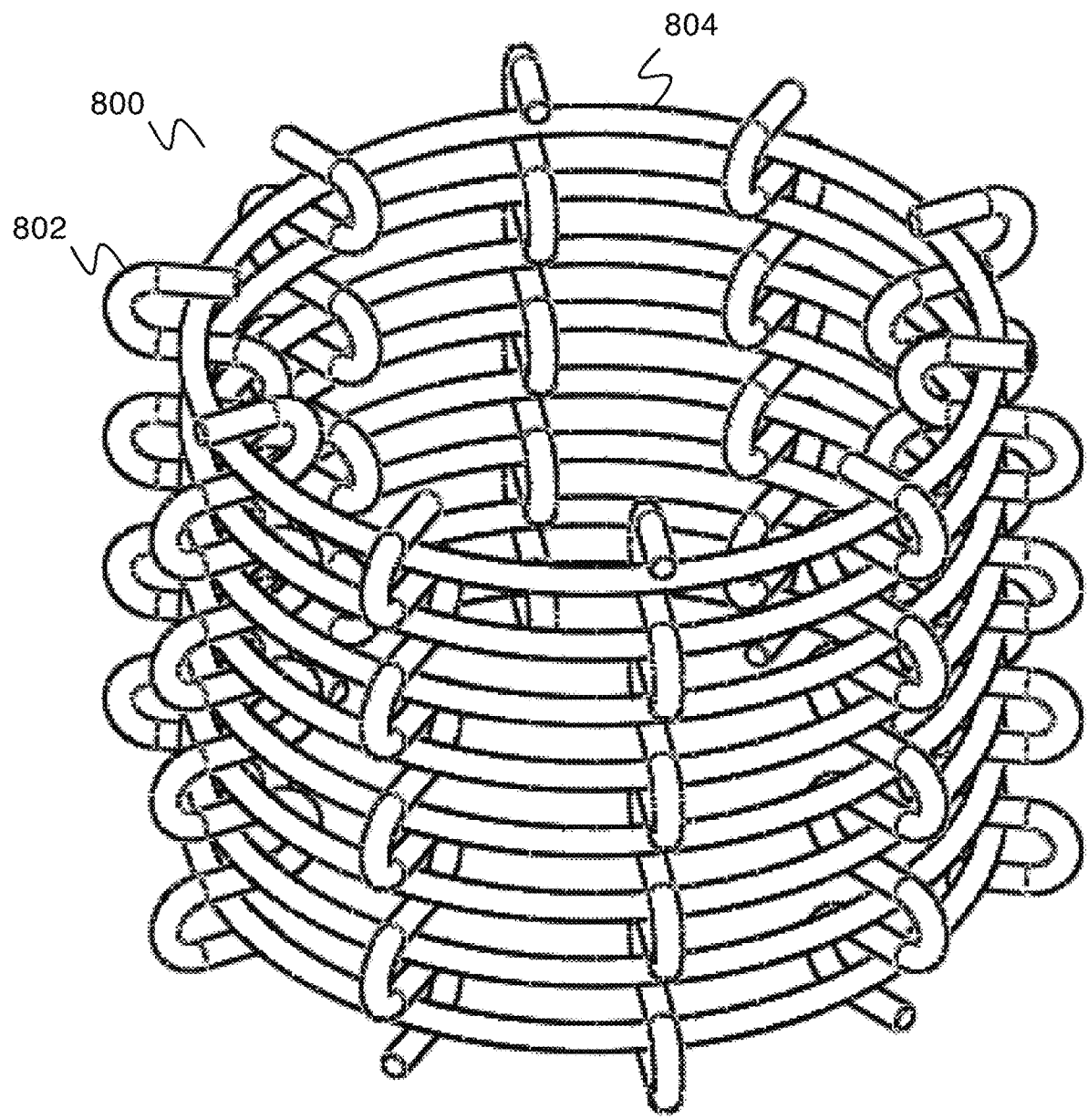
FIG. 8 is a diagram illustrating an embodiment of a fabric.

FIG. 8 is a diagram illustrating an embodiment of a fabric. In some embodiments, fabric 800 is used in conjunction with a fluid-tight chamber (e.g., chamber 100 of FIG. 1). In some embodiments, fabric 800 is fastened to the outside of a fluid-tight chamber. In the example shown, fabric 800 of FIG. 8 comprises a set of fibers. The fibers comprise axial fibers (e.g., fiber 802) and circumferential fibers (e.g., fiber 804). The axial fibers, as shown, are able to straighten as the fabric expands in an axial direction (e.g., as chamber 100 of FIG. 1 extends). The circumferential fibers constrain the fabric circumference, preventing an included chamber from expanding circumferentially. In some embodiments, the motion of the included chamber as pressure increases is guided by fabric 800. In various embodiments, the fabric is designed to guide an included chamber to bend as volume increases, to stop increasing at a given length, to expand into a sphere, an ellipsoid, or other desired shape, or to expand in any other appropriate way as volume increases.

In some embodiments, a fluidic actuator comprises a rolling bellows actuator. A rolling bellows actuator comprises a fluidic actuator configuration capable of changing the angle of an end effector. In some embodiments, a rolling bellows actuator comprises a one degree of freedom actuator (e.g., the flat surface effector rotates about a line). In some embodiments, a rolling bellows actuator comprises a two degree of freedom actuator (e.g., the flat surface effector rotates about a point).

Figure 9:
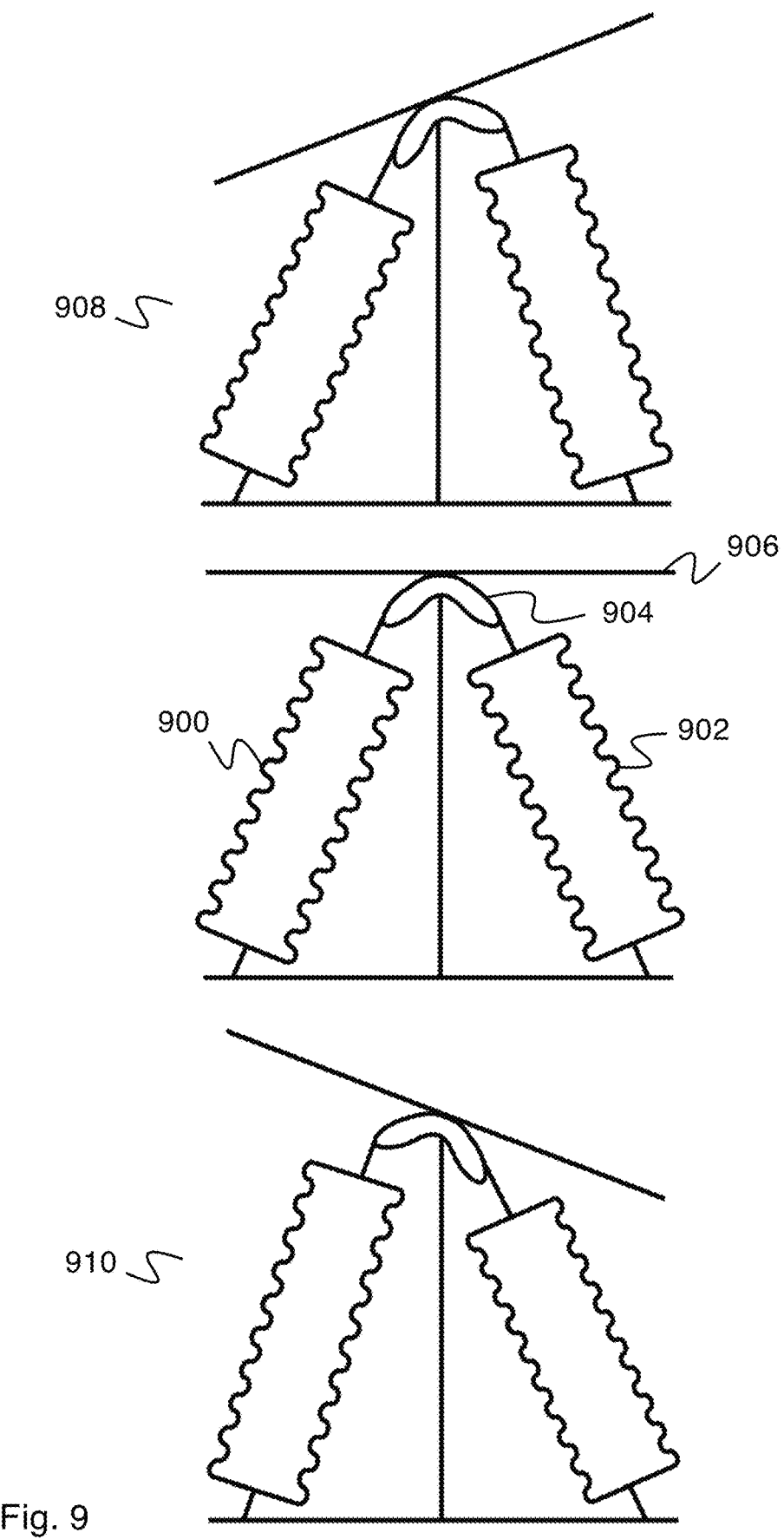
FIG. 9 is a diagram illustrating cross section views of three positions of a rolling fluidic actuator.

FIG. 9 is a diagram illustrating cross section views of three positions of a rolling fluidic actuator. In the example shown, each of chamber 900 and chamber 902 comprises a one degree of freedom stem bellows actuator (e.g., as in chamber 100 of FIG. 1). Chamber 900 and chamber 902 are connected via flexure spines to cam 904. Effector 906 is mounted on cam 904. If the volume of chamber 900 and the volume of chamber 902 change in opposite directions, cam 904 rotates and effector 906 tilts. If the pressure of chamber 900 and the pressure of chamber 902 change in opposite directions, the torque applied to effector 906. In some embodiments, if the pressure of chamber 900 and the pressure of chamber 902 change in the same direction, cam 904 and effector 906 while maintaining a constant pressure ratio, the actuator stiffness increases (e.g., the external force necessary to move effector 906 increases). Actuator 908 comprises a rolling fluidic actuator actuated to tilt its effector to the left. Actuator 910 comprises a rolling fluidic actuator actuated to tilt its effector to the right. In some embodiments, the ration of internal pressures determines a unique unloaded equilibrium position.

Figure 10:
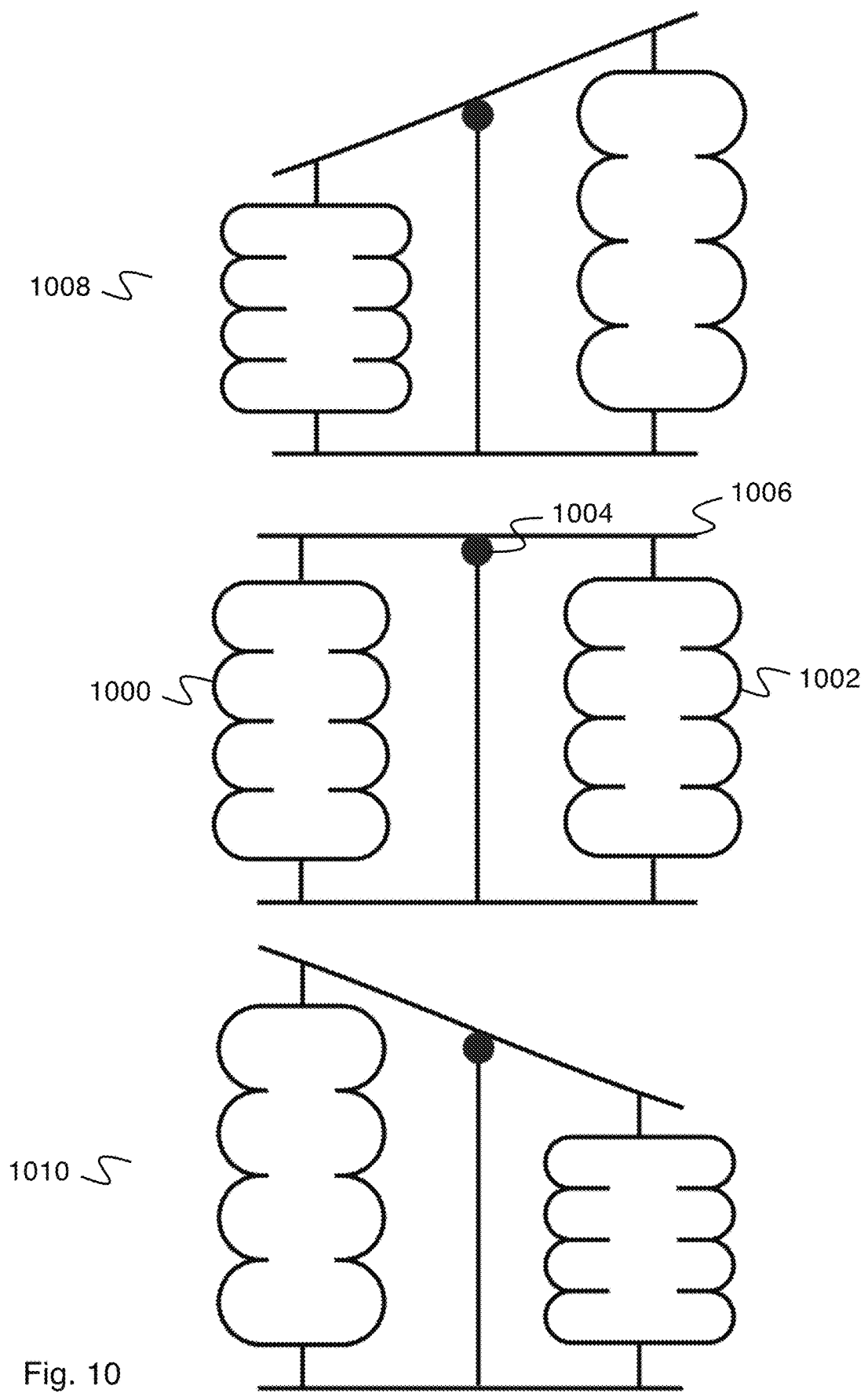
FIG. 10 is a diagram illustrating cross section views of three positions of a rolling fluidic actuator.

FIG. 10 is a diagram illustrating cross section views of three positions of a rolling fluidic actuator. In the example shown, each of chamber 1000 and chamber 1002 comprises a one degree of freedom stem fluidic actuator (e.g., as in chamber 100 of FIG. 1). Chamber 1000 and chamber 1002 are connected to effector 1006. Effector 1006 is mounted on pivot 1004. If the volume of chamber 1000 and the volume of chamber 1002 change in opposite directions, pivot 1004 rotates and effector 1006 tilts. If the pressure of chamber 1000 and the pressure of chamber 1002 change in opposite directions, the torque applied by the actuator to effector 1006 changes. In some embodiments, if the pressure of chamber 1000 and the pressure of chamber 1002 change in the same direction while maintaining a constant pressure ratio, pivot 1004 and effector 1006, the actuator stiffness increases (e.g., the external force necessary to move effector 1006 increases). Actuator 1008 comprises a rolling fluidic actuator actuated to tilt its effector to the left. Actuator 1010 comprises a rolling fluidic actuator actuated to tilt its effector to the right.

Figure 11:
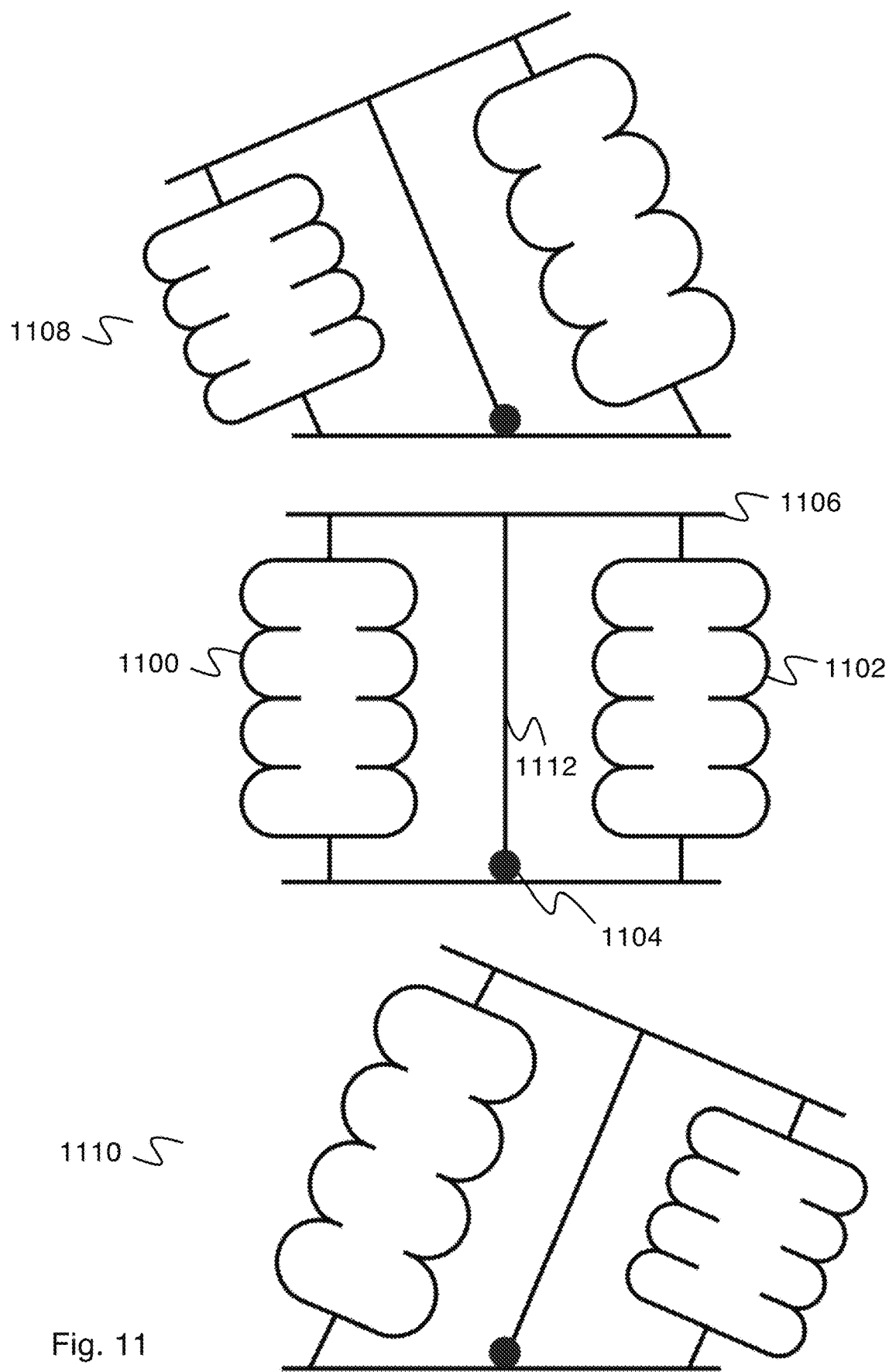
FIG. 11 is a diagram illustrating cross section views of three positions of a rolling fluidic actuator.

FIG. 11 is a diagram illustrating cross section views of three positions of a rolling fluidic actuator. In the example shown, each of chamber 1100 and chamber 1102 comprises a one degree of freedom stem fluidic actuator (e.g., as in chamber 100 of FIG. 1). Chamber 1100 and chamber 1102 are connected to effector 1106. Effector 1106 is connected to pivot 1104 via flexure spine 1112. If the volume of chamber 1100 and the volume of chamber 1102 change in opposite directions, pivot 1104 rotates, causing flexure spine 1112 and effector 1106 to tilt. If the pressure of chamber 1100 and the pressure of chamber 1102 change in opposite directions, the torque applied by the actuator to effector 1106 changes. In some embodiments, if the pressure of chamber 1100 and the pressure of chamber 1102 change in the same direction while maintaining the same pressure ratio, pivot 1104, flexure spine 1112, and effector 1106, the actuator stiffness increases (e.g., the external force necessary to move effector 1106 increases). Actuator 1108 comprises a rolling fluidic actuator actuated to tilt its effector to the left. Actuator 1110 comprises a rolling fluidic actuator actuated to tilt its effector to the right.

Figure 12A:
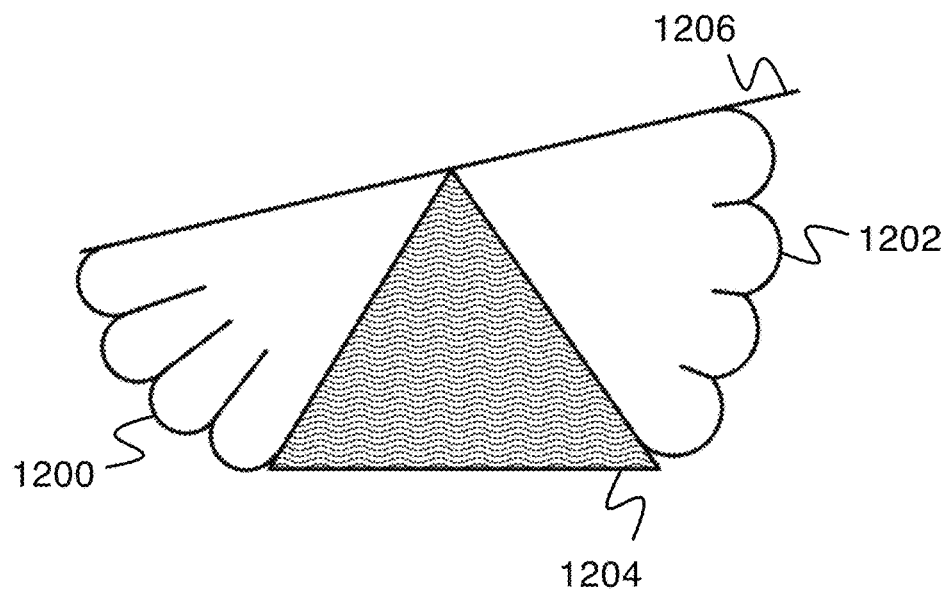
FIG. 12A is a diagram illustrating a side cross section view of rolling fluidic actuator.
Figure 12B:
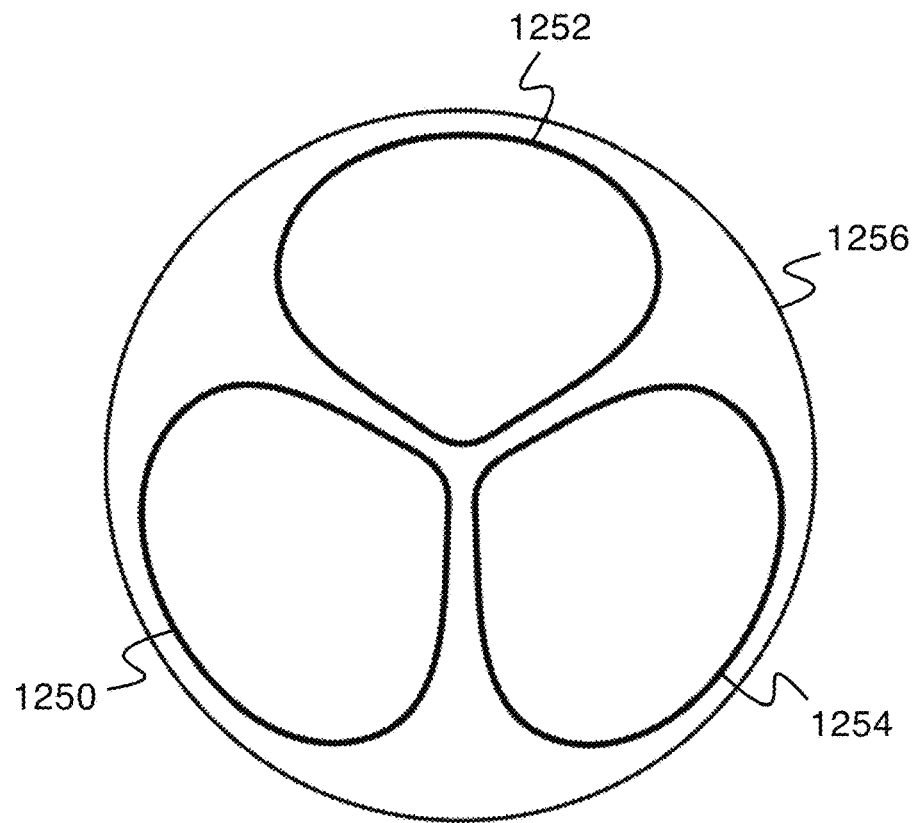
FIG. 12B is a diagram illustrating a top cross section view rolling fluidic actuator.

FIG. 12A is a diagram illustrating a side cross section view of rolling fluidic actuator. In the example shown, each of chamber 1200 and chamber 1202 comprises a chamber. In some embodiments, each of chamber 1200 and chamber 1202 comprise a bulbous chamber. In some embodiments, each of chamber 1200 and chamber 1202 comprises a wedge-shaped chamber that increase in size (e.g., the angular size of the wedge) when inflated. Chamber 1202 comprises a wedge-shaped chamber inflated to a greater degree than chamber 1200. Chamber 1200 and chamber 1202 are mounted to triangular pivot 1204. Effector 1206 is mounted to triangular pivot 1204 and attached to chamber 1200 and chamber 1202. If the volume of chamber 1200 and the volume of chamber 1202 change in opposite directions, effector 1206 tilts on triangular pivot 1204. If the pressure of chamber 1200 and the pressure of chamber 1202 change in opposite directions, the torque applied to effector 1206 changes. In some embodiments, if the pressure of chamber 1200 and the pressure of chamber 1202 both increase while maintaining a constant pressure ratio, the actuator stiffness increases (e.g., the external force necessary to move effector 1206 increases). FIG. 12B is a diagram illustrating a top cross section view rolling fluidic actuator. FIG. 12B illustrates a rolling fluidic actuator in top-down view. In the example shown, each of chamber 1250, chamber 1252, and 1254 comprises a chamber (e.g., a chamber as in chamber 1200 of FIG. 12A). Effector 1256 is attached to chamber 1250, chamber 1252, and chamber 1254. Effector 1256 is additionally mounted on a triangular pivot (e.g., a triangular pivot as in triangular pivot 1204 of FIG. 12A). The triangular pivot comprises a cone (e.g., the shape made by rotating triangular pivot 1204 of FIG. 12A about its vertical center line) contacting effector 1256 at its center point. Effector 1256 can be adjusted to any appropriate angle in two dimensions (e.g. rotated about a horizontal line or rotated about a vertical line) by changing the volume of chamber 1250, chamber 1252, and chamber 1254. In some embodiments, the rolling fluidic actuator of FIG. 12B comprises four chambers (e.g., dividing effector 1256 into quarters rather than thirds).

In some embodiments, in the event fluid is added to or removed from the chamber, one or more convolutions of the chamber deflect causing a change in orientation between the top and bottom couplers. Convolutions of the chamber comprise folds or ridges that allow deflection. Convolutions can be designed in many different possible ways. In some embodiments, convolutions comprise radial convolutions—for example, loops formed around the chamber in the shape of a semicircle in cross-section. In some embodiments, convolutions comprise longitudinal convolutions—for example, vertical folds running the length of the chamber. In some embodiments, convolutions comprise uniform convolutions—for example, stacked opposing semicircles of equal radius. In some embodiments, convolutions comprise non-uniform convolutions—for example, stacked opposing semicircles of unequal radius, changing along the length of the chamber. In some embodiments, convolutions comprise secondary convolutions, for example, small longitudinal convolutions running along a radial convolution, or small radial convolutions along a longitudinal convolution to relieve material strain (and therefore stress) in sections where complicated coupling exists. In some embodiments, convolutions comprise discontinuous convolutions—for example, a discontinuity where no convolutions are present exists between two regions of convolutions along the chamber. In some embodiments, convolutions comprise asymmetric convolutions—for example, radial convolutions that change shape or size around the radius of the chamber.

Figure 13:
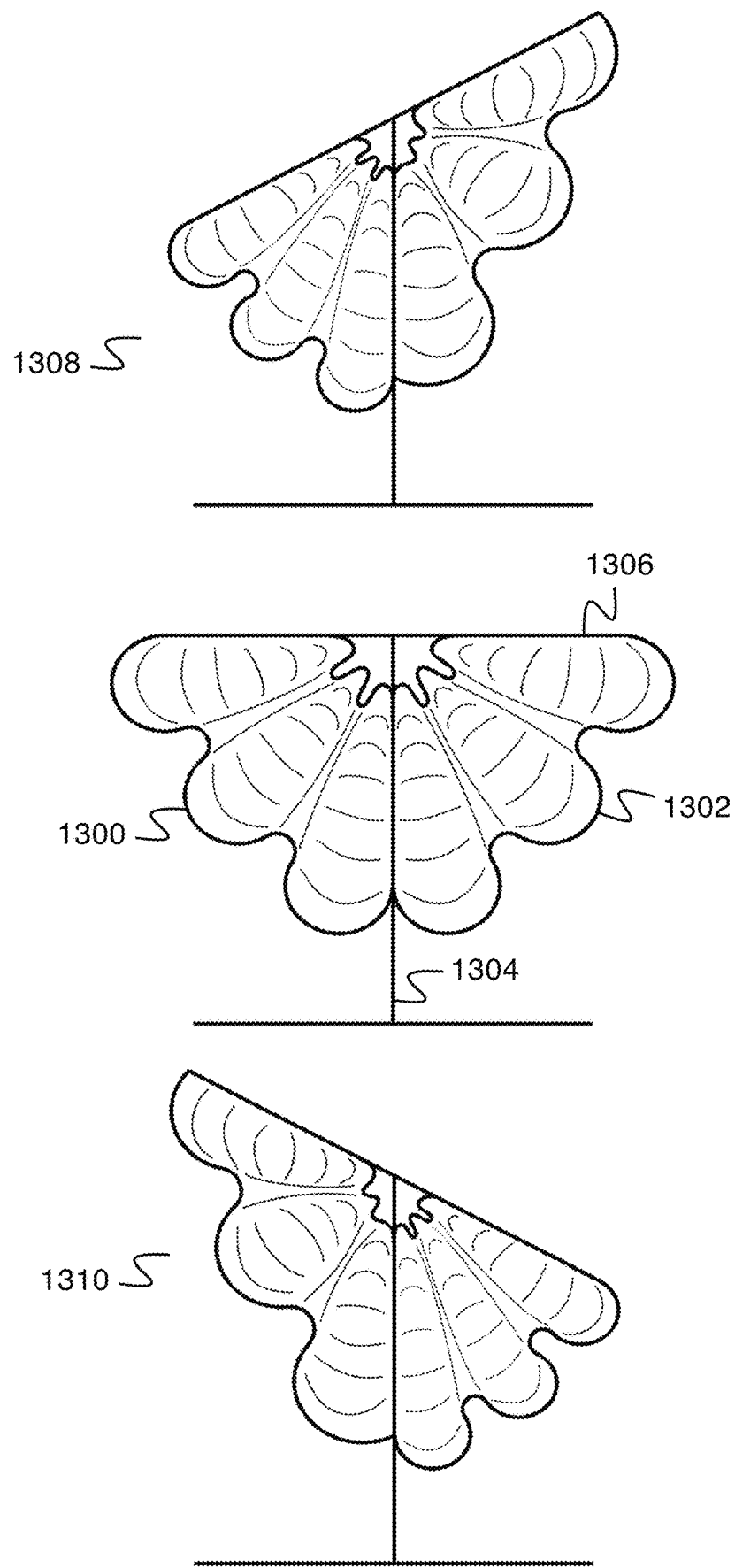
FIG. 13 is a diagram illustrating side views of three positions of a multiconvolution rolling fluidic actuator.

FIG. 13 is a diagram illustrating side views of three positions of a multiconvolution rolling fluidic actuator. In some embodiments, each of chamber 1300 and chamber 1302 comprise a bulbous chamber. In some embodiments, each of chamber 1300 and chamber 1302 comprises a wedge-shaped chamber that increase in size (e.g., the angular size of the wedge) when inflated.

In the example shown, chamber 1300 and chamber 1302 comprise multiple convolution chambers (e.g., chambers with multiple degrees of convolutions). Major level convolutions are present opposite the direction of extension (e.g., the chambers extend in an angular direction—increasing or decreasing the angle between effector 1306 and flexure spine 1304, and the major convolutions are in a radial direction), and smaller minor level convolutions are present opposite the direction of the major level convolutions. In some embodiments, the major level convolutions serve to increase compliance (e.g., reduce stiffness) of the chamber, and the minor level convolutions serve to increase compliance of the major level convolutions.

Chamber 1300 and chamber 1302 are connected to effector 1306. Effector 1306 is connected to flexure spine 1304 at a pivot point. If the volume of chamber 1300 and the volume of chamber 1302 change in opposite directions, the pivot point rotates, causing effector 1306 to tilt. If the pressure of chamber 1300 and the pressure of chamber 1302 change in opposite directions, the torque applied to effector 1306 changes. In some embodiments, if the pressure of chamber 1300 and the pressure of chamber 1302 change in the same direction while maintaining a constant pressure ratio, the actuator stiffness increases (e.g., the external force necessary to move effector 1306 increases). Actuator 1308 comprises a rolling fluidic actuator actuated to tilt its effector to the left. Actuator 1310 comprises a rolling fluidic actuator actuated to tilt its effector to the right.

Figure 14:
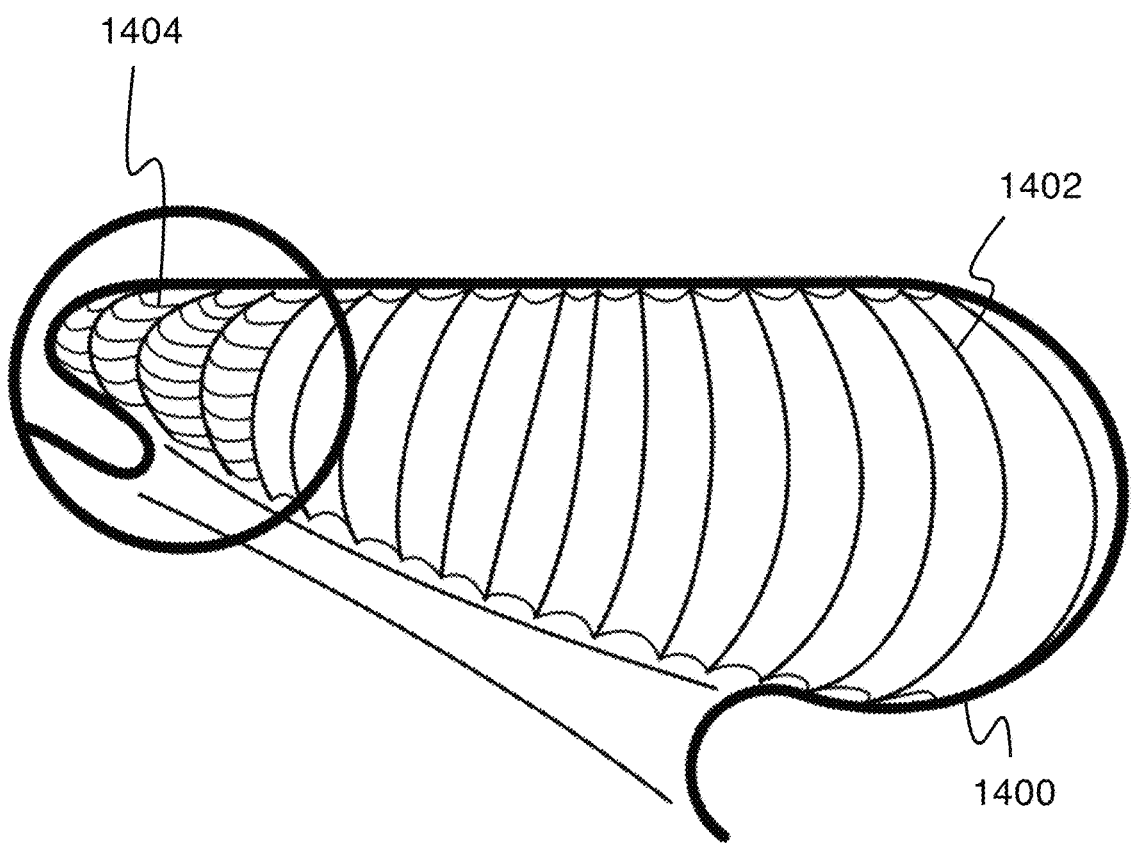
FIG. 14 is a diagram illustrating a side view of an embodiment of a portion of a chamber with multiple levels of convolutions.

FIG. 14 is a diagram illustrating a side view of an embodiment of a portion of a chamber with multiple levels of convolutions. In some embodiments, the portion of a chamber comprises a portion of a chamber used in a multiconvolution actuator (e.g., the multiconvolution actuator of FIG. 13). In the example shown, the portion of a chamber comprises three levels of convolutions. A first level of convolutions (e.g., convolution 1400) comprise convolutions for allowing the chamber to expand or contract. A second level of convolutions (e.g., convolution 1402) comprise convolutions for increasing the compliance of the first level of convolutions. A third level of convolutions (e.g., convolution 1404) comprise convolutions for increasing the compliance of the second level of convolutions. In some embodiments, multiple convolutions are about increasing compliance so as to mitigate high strain to accommodate large variations in outer diameter of a chamber. In some embodiments, using multiple convolutions enables the use of a rigid plastic to achieve large range of motion. In some embodiments, secondary convolutions must be small compared to primary convolutions to maintain flexibility of the primary convolutions.

Figure 15:
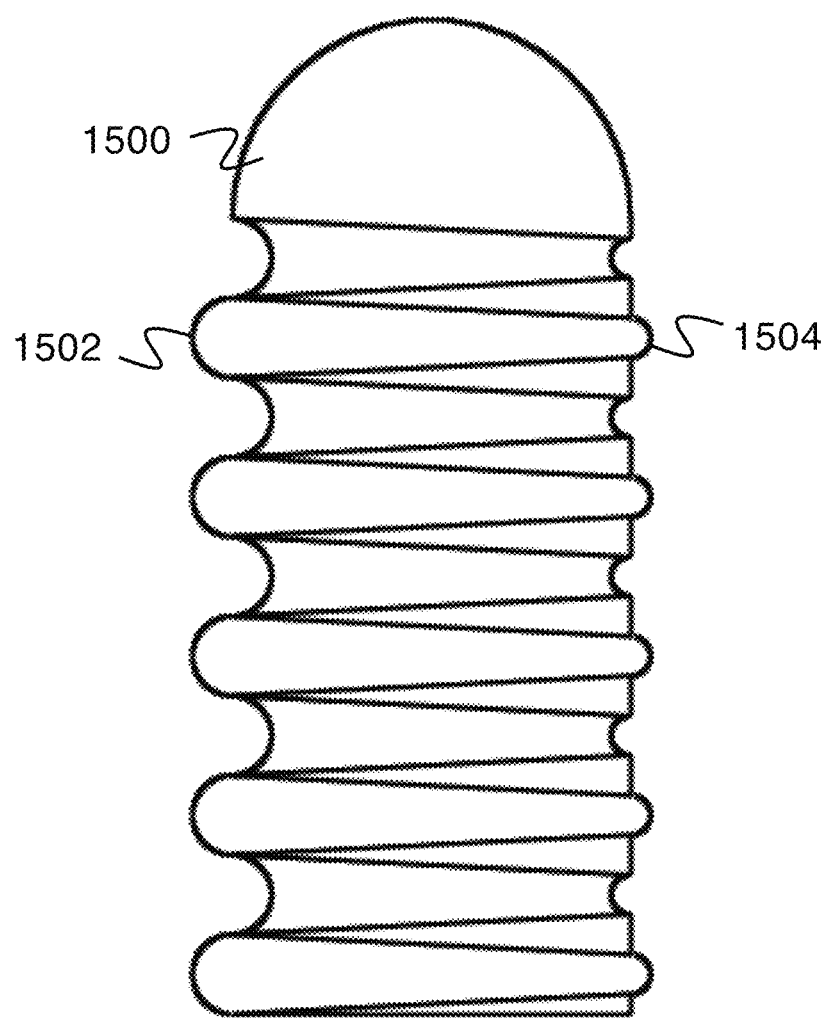
FIG. 15 is a diagram illustrating a side view of an embodiment of a chamber with asymmetric convolutions.

FIG. 15 is a diagram illustrating a side view of an embodiment of a chamber with asymmetric convolutions. In some embodiments, chamber 1504 comprises a one degree of freedom fluidic actuator (e.g., as in chamber 100 of FIG. 1). In the example shown, chamber 1500 comprises asymmetric convolutions. Each convolution has a large side (e.g., large side 1502) and a small side (e.g., small side 1504). Large convolutions provide greater compliance than small convolutions, causing the compliance on one side of the chamber to be greater than the compliance on the other side of the chamber. In some embodiments, the uneven compliance causes the chamber to bend as it expands and contracts. In some embodiments, the convolutions on a chamber can be designed to give the chamber a desired shape when expanded (e.g., S-curve, spiral, etc.).

Figure 16:
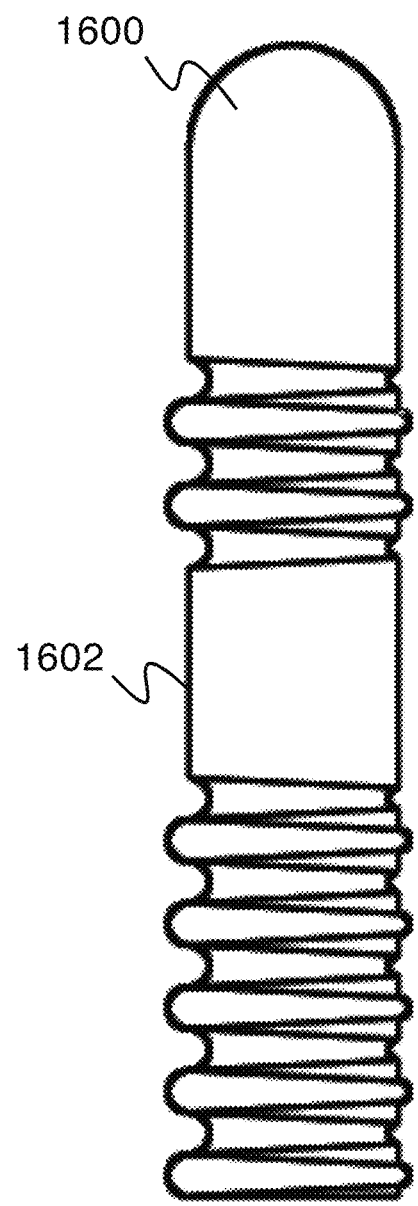
FIG. 16 is a diagram illustrating a side view of an embodiment of a chamber with discontinuous convolutions.

FIG. 16 is a diagram illustrating a side view of an embodiment of a chamber with discontinuous convolutions. In some embodiments, chamber 1600 comprises a one degree of freedom fluidic actuator (e.g., as in chamber 100 of FIG. 1). In the example shown, chamber 1600 comprises convolutions including a discontinuity. Discontinuity 1602 comprises a section that remains straight and not deformed as the volume of chamber 1600 changes. In some embodiments, chamber 1600 changes in the shape of a curling finger as the volume changes (e.g., bending regions including asymmetric convolutions simulate knuckles, and straight regions including discontinuities simulate bones).

Figure 17:
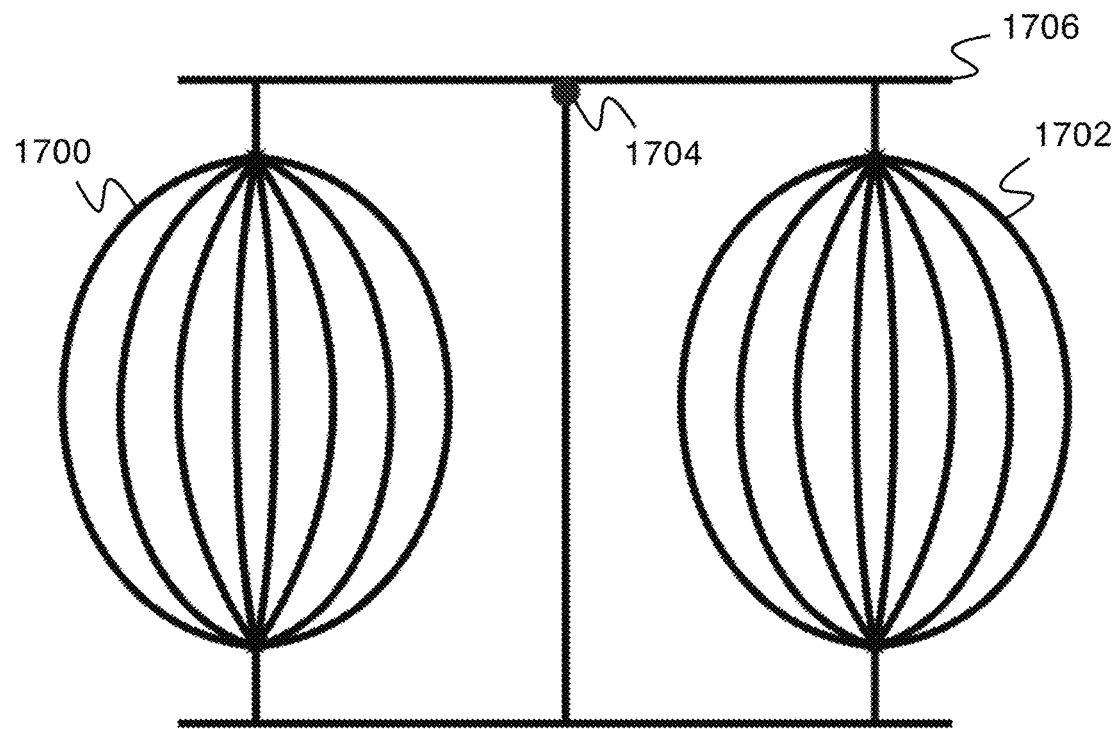
FIG. 17 is a diagram illustrating side views of an embodiment of two positions of a rolling fluidic actuator incorporating a vertical convolution chamber.
Figure 17:
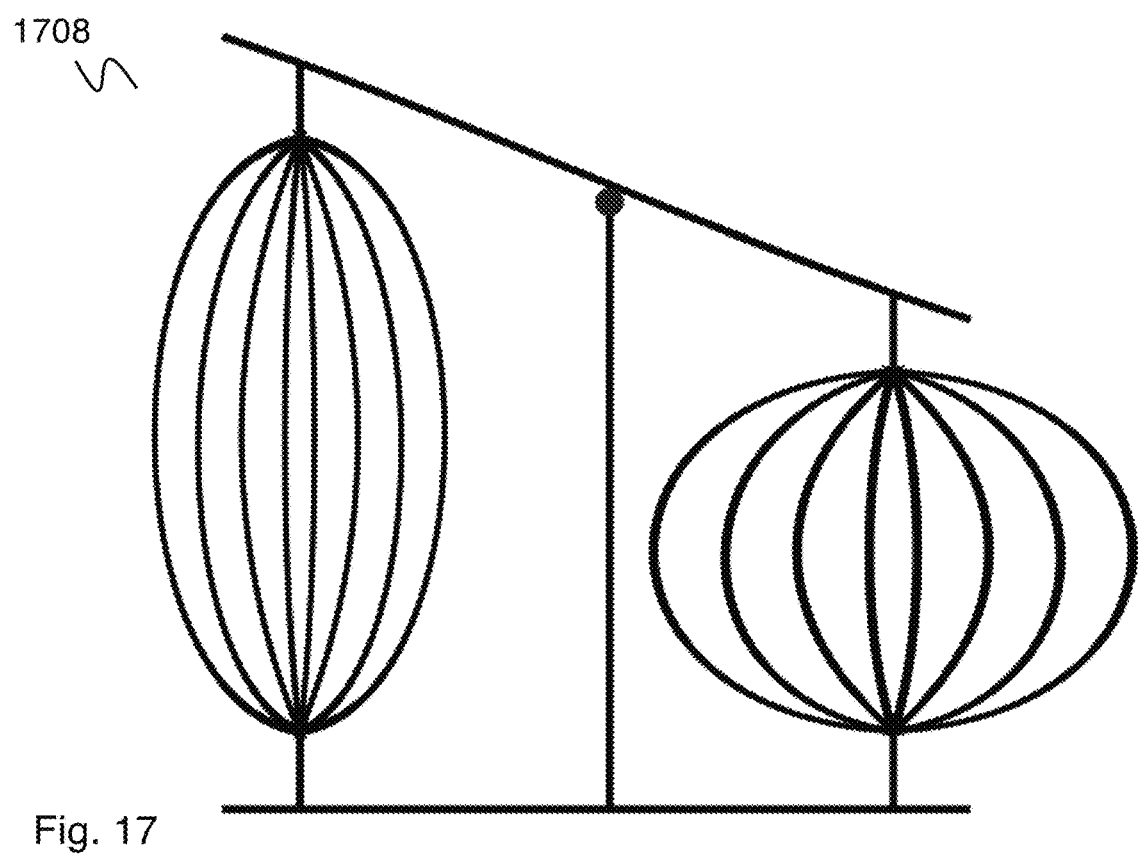

FIG. 17 is a diagram illustrating side views of an embodiment of two positions of a fluidic actuator incorporating a vertical convolution chamber. In the example shown, each of chamber 1700 and chamber 1702 comprises a vertical convolution chamber. In some embodiments, a vertical convolution chamber comprises a chamber including vertical convolutions (e.g. that cause the diameter of the chamber to expand and contract when the internal volume changes, rather than the length). Chamber 1700 and chamber 1702 are connected to effector 1706. Effector 1706 is mounted on pivot 1704. If the volume of chamber 1700 and the volume of chamber 1702 change in opposite directions, pivot 1704 rotates and effector 1706 tilts. If the pressure of chamber 1700 and the pressure of chamber 1702 change in opposite directions, the torque applied to effector 1706 changes. In some embodiments, if the pressure of chamber 1700 and the pressure of chamber 1702 change in the same direction while maintaining a constant pressure ration, pivot 1704 and effector 1706 do not move. In some embodiments, if the volume of chamber 1700 and the volume of chamber 1702 both increase, the actuator stiffness increases (e.g., the external force necessary to move effector 1706 increases). Actuator 1708 comprises a fluidic actuator actuated to tilt its effector to the right.

Figure 18:
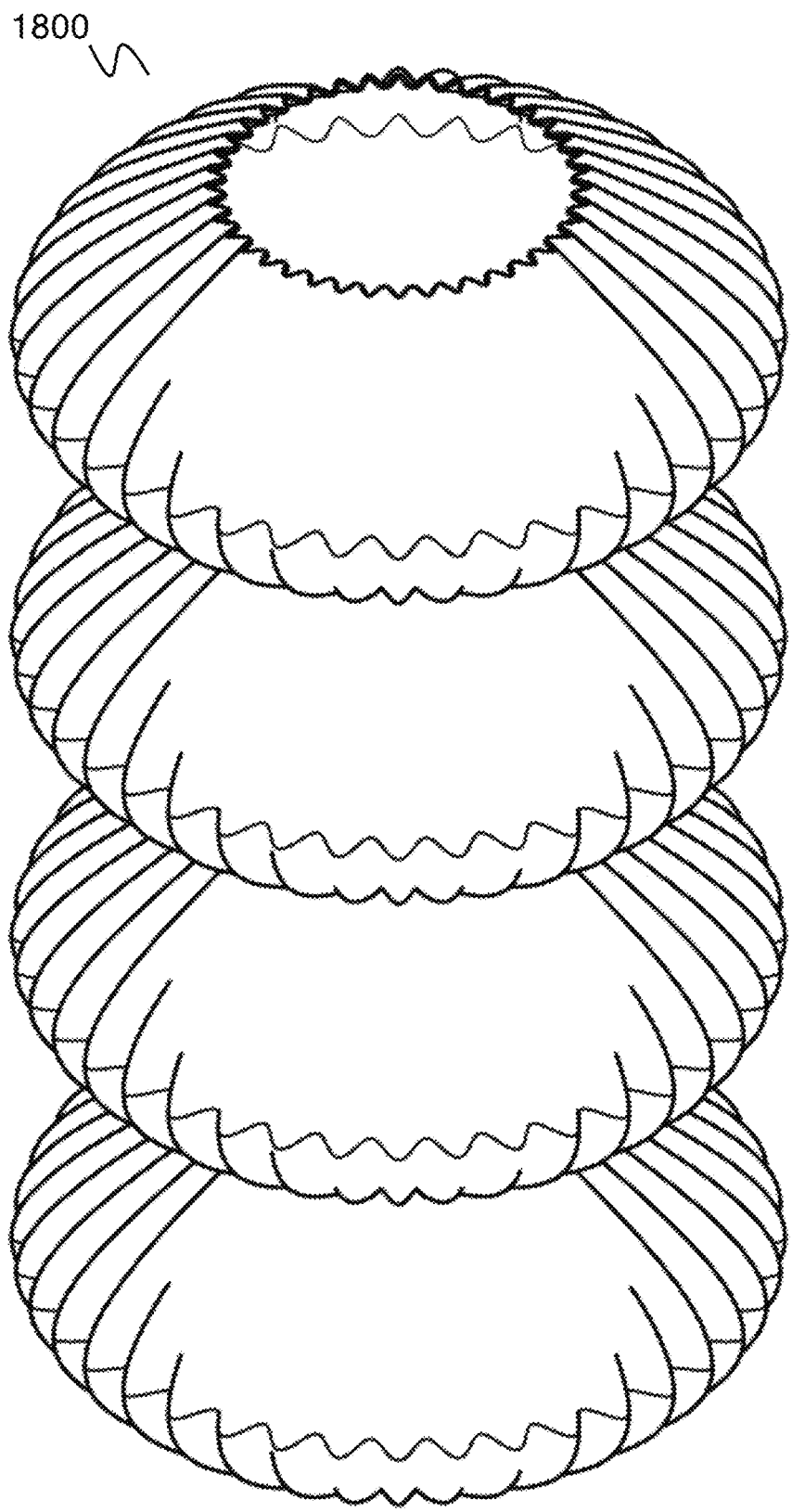
FIG. 18 is a diagram illustrating an embodiment of an extended vertical convolution chamber.

FIG. 18 is a diagram illustrating an embodiment of an extended vertical convolution chamber. In the example shown, chamber 1800 comprises a vertical convolution chamber (e.g., as in chamber 1700 of FIG. 17). Chamber 1800 comprises multiple stacked levels of vertical convolution chambers, in order to increase the total extension possible when the chamber volume is increased. In some embodiments, chamber 1800 comprises a multiple convolution chamber (e.g., including circumferential primary convolutions and vertical secondary convolutions).

Figure 19:
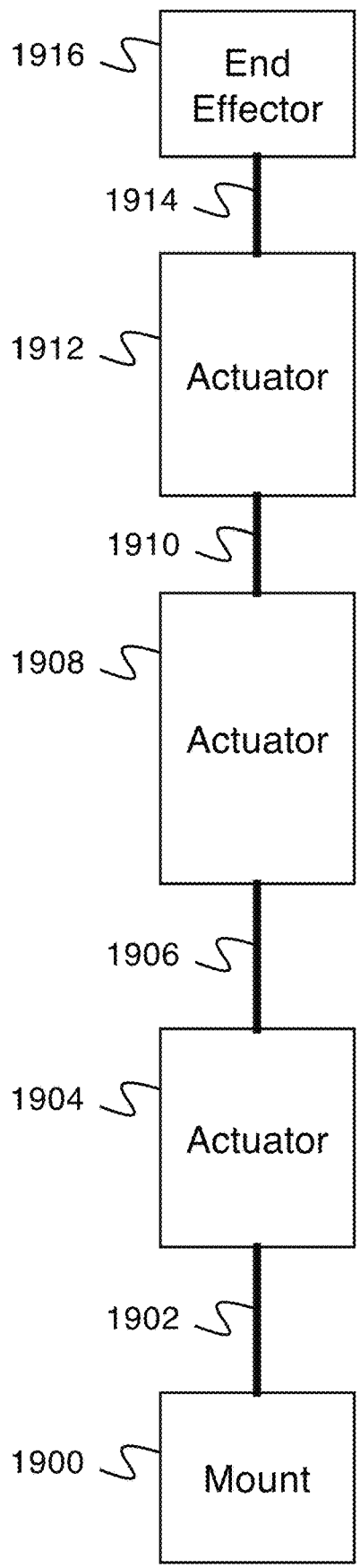
FIG. 19 is a block diagram illustrating an embodiment of a serial manipulator.

FIG. 19 is a block diagram illustrating an embodiment of a serial manipulator. In some embodiments, a serial manipulator comprises a robotic actuator. In some embodiments, a serial manipulator comprises a robotic arm. In the example shown, actuator 1904 is coupled via coupler 1902 to mount 1900. In various embodiments, mount 1900 comprises a fixed base (e.g., a base fixed to the ground), a moving base (e.g., a base capable of moving under its own power), a robotic torso, a human mount (e.g., a mount for mounting the serial manipulator to a human), an animal mount (e.g., a mount for mounting the serial manipulator to an animal), or any other appropriate mount. In various embodiments, actuator 1904 comprises a bellows actuator, a stem bellows actuator, a rolling bellows actuator, a one degree of freedom actuator, a two degree of freedom actuator, a three degree of freedom actuator, or any other appropriate actuator. Actuator 1904 is coupled via coupler 1906 to actuator 1908. In various embodiments, actuator 1908 comprises a bellows actuator, a stem bellows actuator, a rolling bellows actuator, a one degree of freedom actuator, a two degree of freedom actuator, a three degree of freedom actuator, or any other appropriate actuator. Actuator 1908 is coupled via coupler 1910 to actuator 1912. In various embodiments, actuator 1912 comprises a bellows actuator, a stem bellows actuator, a rolling bellows actuator, a one degree of freedom actuator, a two degree of freedom actuator, a three degree of freedom actuator, or any other appropriate actuator. Actuator 1912 is coupled via coupler 1914 to end effector 1916. In various embodiments, end effector 1916 comprises a sensor, a claw, a gripper, a coupler, or any other appropriate end effector. In various embodiments, each of coupler 1902, coupler 1904, coupler 1906, coupler 1908, coupler 1910, coupler 1912, and coupler 1914 comprise a straight coupler, a bent coupler, a flexible coupler, an inflated coupler, a fluid filled coupler, or any other appropriate coupler.

In some embodiments, the serial manipulator additionally comprises a processor. In various embodiments, the processor is contained in mount 1900, coupler 1902, actuator 1904, end effector 1916, or any other appropriate part of the serial manipulator. In some embodiments, the processor is mounted to a blow molded bellows (e.g., a blow molded bellows comprising part of actuator 1904, actuator 1908, or actuator 1912). In some embodiments, the processor is coupled to a network. In some embodiments, the network comprises a communications network running throughout the serial manipulator. In some embodiments, the processor is connected to sensors. In various embodiments, the sensors are mounted on mount 1900, coupler 1902, actuator 1904, end effector 1916, or any other appropriate part of the serial manipulator. In various embodiments, the sensors comprise position sensors, orientation sensors, pressure sensors, temperature sensors, flow rate sensors, volume sensors, or any other appropriate sensors. In some embodiments, the processor is connected to valves. In some embodiments, the valves control flow into and out of actuators (e.g., actuator 1904, actuator 1908, or actuator 1912). In some embodiments, a robotic device comprises a plurality of serial manipulators. In some embodiments, the plurality of serial manipulators is connected serially. In some embodiments, the plurality of serial manipulators is connected in parallel.

In some embodiments, a serial manipulator includes monitoring sensors of the system including sensors of fluid flow and fluid state (e.g., the gas dynamics of the air that is directed to and from an actuator that causes the actuator to move) in a plurality of actuators of the serial manipulator. The serial manipulator also includes a processor to receive sensor signals and provide coordinated control of the plurality of actuators of the serial manipulator (e.g., coordinated motion between multiple serial linkages placed in parallel— for example, two arms mounted to a torso). In some embodiments, multiple serial manipulators are placed in parallel (e.g., a first set of actuators is in parallel to a second set of actuators of a robot). In some embodiments, a controller controls the parallel elements of the manipulator in a coordinated manner (e.g., one arm handing something to another arm, two legs walking, etc.).

Figure 20:
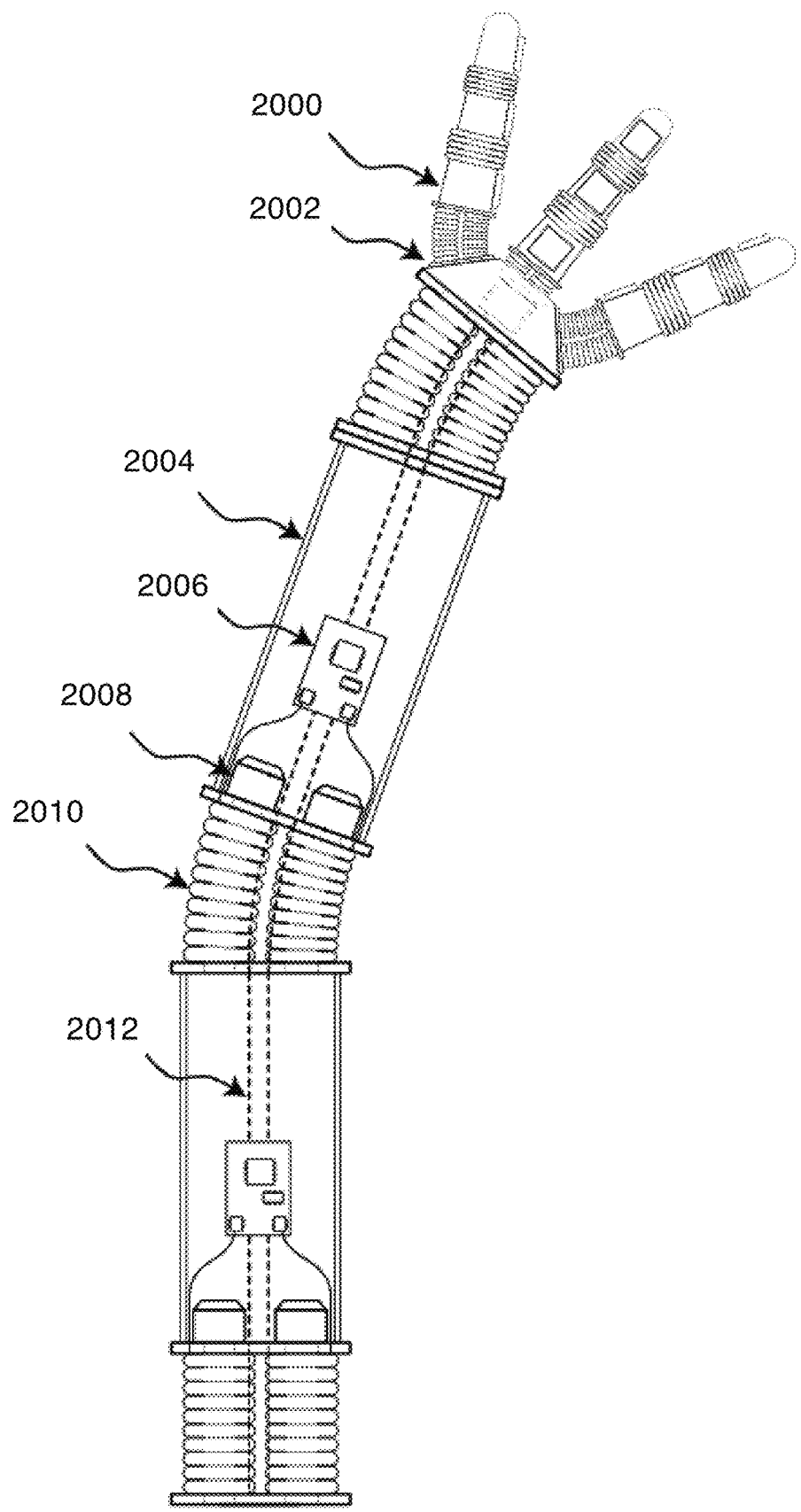
FIG. 20 is a diagram illustrating an embodiment of a robot arm.

FIG. 20 is a diagram illustrating an embodiment of a robot arm. In some embodiments, the robot arm of FIG. 20 comprises a serial manipulator (e.g., the serial manipulator of FIG. 19). In the example shown, finger 2000 comprises a finger. Finger 2000 comprises regions with bellows and regions without bellows (e.g., discontinuities). In some embodiments, finger 2000 comprises chamber 1600 of FIG. 16. Base 2002 comprises a base for an end effector. In some embodiments, base 2002 comprises a base for attaching fingers to the end of a robot arm. In some embodiments, base 2002 comprises a base for forming a gripper. Coupler 2004 comprises a coupler for coupling actuators in a serial manipulator. In some embodiments, coupler 2004 comprises a blow molded structure that acts as a fluid storage and transport. In some embodiments, coupler 2004 transports fluid to actuators. Node 2006 comprises a networked actuator node. In some embodiments, node 2006 comprises a processor. In various embodiments, node 2006 comprises communications, processing, sensing, data storage, data display, or any other appropriate function. In some embodiments, node 2006 is connected to a network. In various embodiments, node 2006 is connected to actuators, sensors, valves, or any other appropriate device. Valve 2008 comprises a valve for opening or closing a fluid flow. In some embodiments, valve 2008 comprises a valve collocated with a bellows actuator. Actuator 2010 comprises an actuator. In some embodiments, actuator 2010 comprises a bellows actuator. In various embodiments, actuator 2010 comprises a stem bellows actuator, a rolling bellows actuator, a one degree of freedom actuator, a two degree of freedom actuator, a three degree of freedom actuator, or any other appropriate actuator. Actuator 2010 comprises a two degree of freedom actuator comprising three one degree of freedom stem bellows actuators. Hose 2012 comprises a high pressure air line. In some embodiments, hose 2012 runs the length of the robot arm. In some embodiments, hose 2012 supplies high pressure air for actuating bellows actuators.

In some embodiments, the system includes the following functions: calibration, control, and communication. For example, for calibration, a robot is operated under a set of known conditions and signals received from sensors are compared to expected values in order to adjust biases, scalings, and offsets inherent to the sensing hardware, embedded system, or electronics. A specific example of calibration is for an inertial measurement unit where the actuator is not moved and offsets in sensing data reporting movement of the actuator are recorded and used to compensate for biases. Similarly, the actuator can be randomly activated such that it covers its entire range of motion and biases in magnetometer signal that cause a variation in magnetic field vector are recorded. For example, for control, a sensor information is combined using models of the robot to estimate the state of the system. The estimated state is compared to a desired state that is either precomputed or calculated online based on operation history and an input command is chosen to move the system towards and eventually to converge upon the desired trajectory. The input command signal is converted to a physical input parameter, such as a valve orifice, and sent to the corresponding hardware device. An example of such a system is the comparison of all chamber pressures, all joint angles, and all joint velocities against desired values to create a set of error signals. A weighted combination of the resulting error signals can be used to compute valve command signals. The weighted combination can be either linear or nonlinear and may be based on a dynamic model of the system. For example, for communication a sensor, a state, a desired state, controller parameters, and other pertinent information is communicated between actuator nodes using either a wired or wireless network giving each node or a central computer the ability work with knowledge of the entire system. A communications protocol is used to transfer information from a single node to the entire network.

Figure 21:
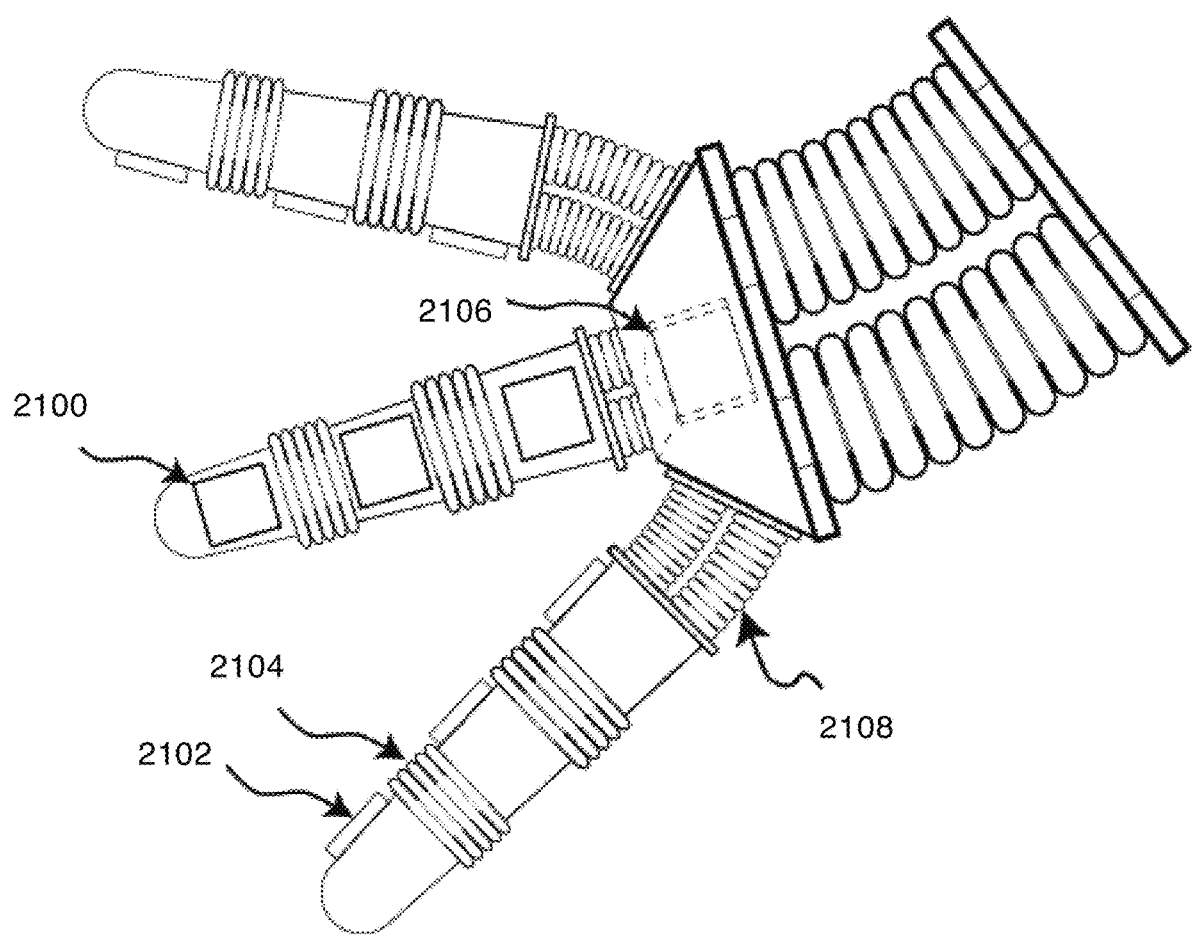
FIG. 21 is a diagram illustrating an embodiment of an end effector.

FIG. 21 is a diagram illustrating an embodiment of an end effector. In some embodiments, the end effector of FIG. 21 comprises a gripper (e.g., a robotic claw, a robotic hand, etc.). In the example shown, sensor 2100 and sensor 2102 comprises pressure sensing elements. Actuator 2104 comprises a bellows actuator. In the example shown, actuator 2104 comprises a one degree of freedom stem bellows actuator. In some embodiments, actuator 2104 comprises a single bellows actuator that uses pressurized fluid for extension and material forces for retraction. Sensor 2106 comprises an inspection device. In some embodiments, sensor 2106 comprises an optical sensor for sensing an object to be gripped. In various embodiments, sensor 2106 comprises one or more cameras, sensors, or any other appropriate inspection devices. Actuator 2108 comprises a bellows actuator. In some embodiments, actuator 2108 comprises an actuator for bending a finger. In some embodiments, actuator comprises a two degree of freedom miniature bellows actuator.

Figure 22:
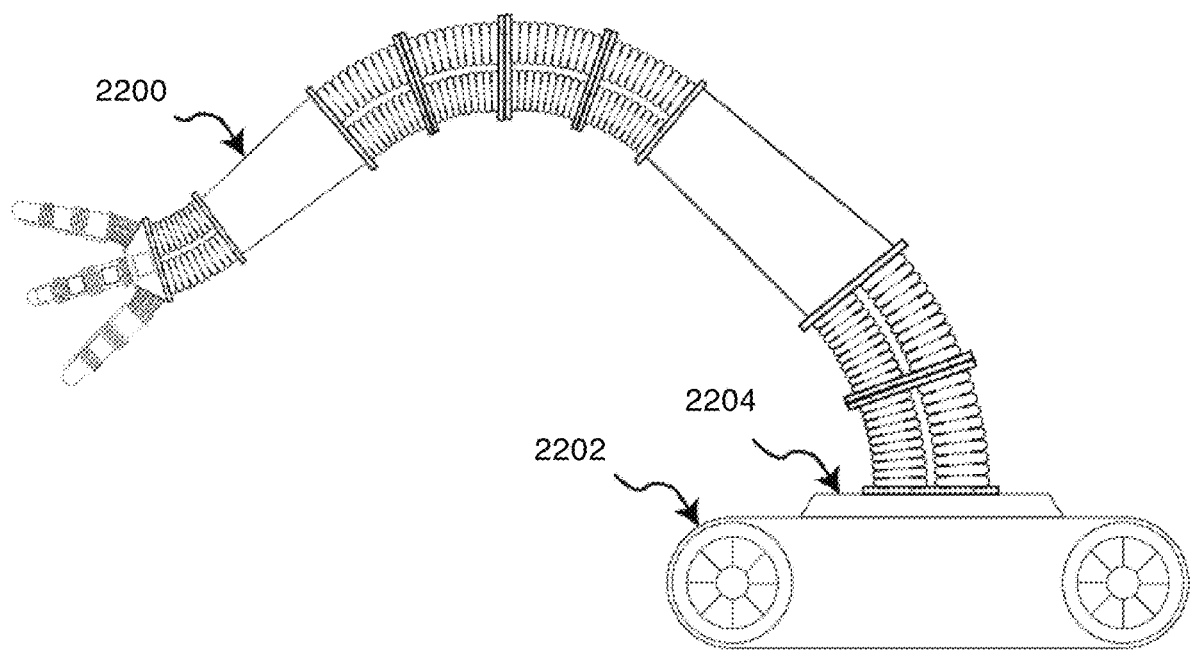
FIG. 22 is a diagram illustrating an embodiment of a serial manipulator.

FIG. 22 is a diagram illustrating an embodiment of a serial manipulator. In some embodiments, the serial manipulator of FIG. 22 comprises a serial manipulator as in the serial manipulator of FIG. 19. In the example shown, the serial manipulator of FIG. 22 comprises a mobile serial manipulator. Manipulator 2200 comprises a mobile manipulator (e.g., a serial connection of actuators and couplers with an end effector, suitable for mounting on a mobile mount). In some embodiments, manipulator 2200 comprises a robot arm. Mobile robot 2202 comprises a mobile mount for a manipulator. In some embodiments, mobile robot 2202 comprises a mobile robot for driving independently. Mounting base 2204 comprises a mounting base for attaching manipulator 2200 to mobile robot 2202.

Figure 23:
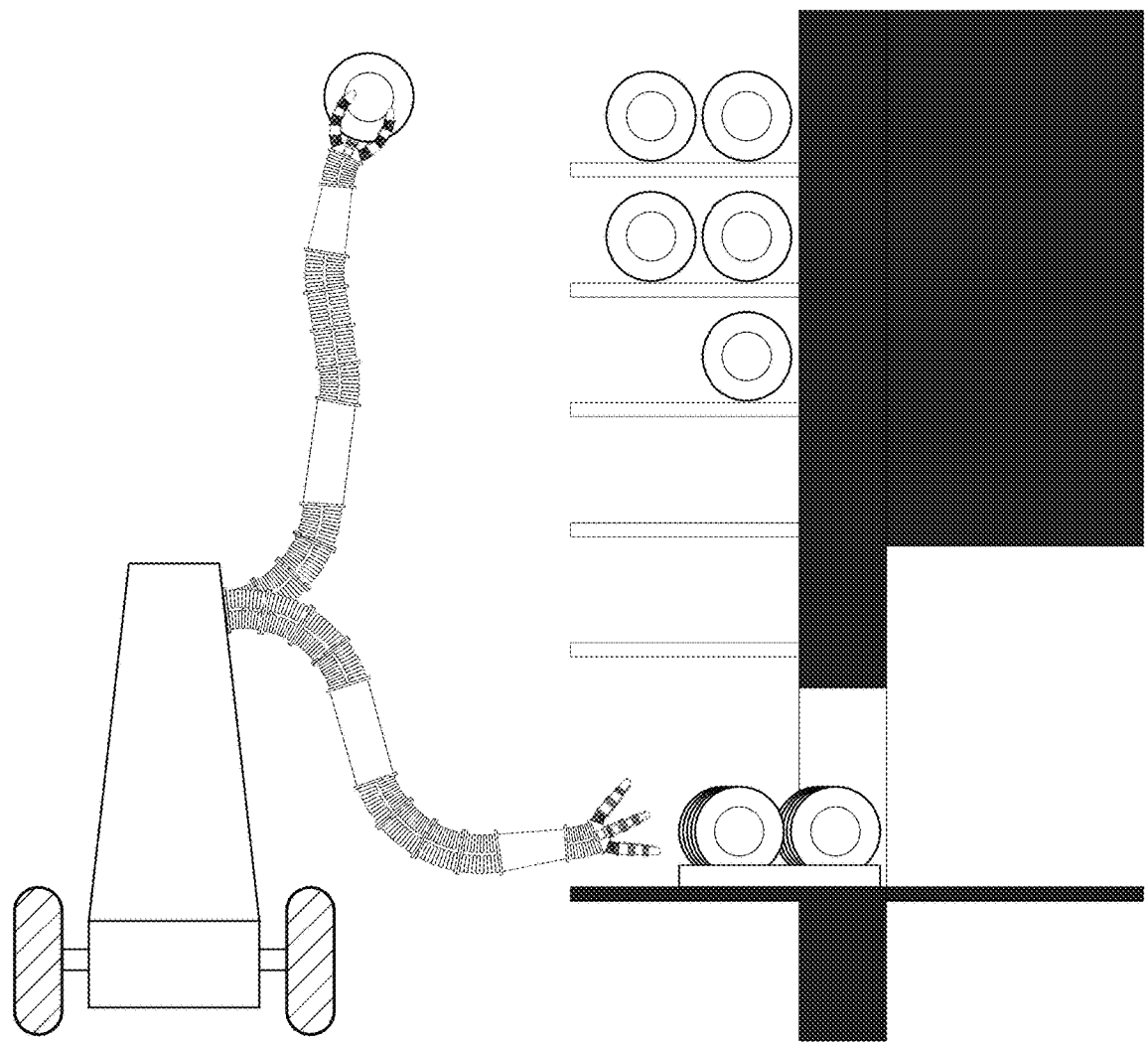
FIGS. 23, 24, and 25 illustrate applications of a serial manipulator.
Figure 24:
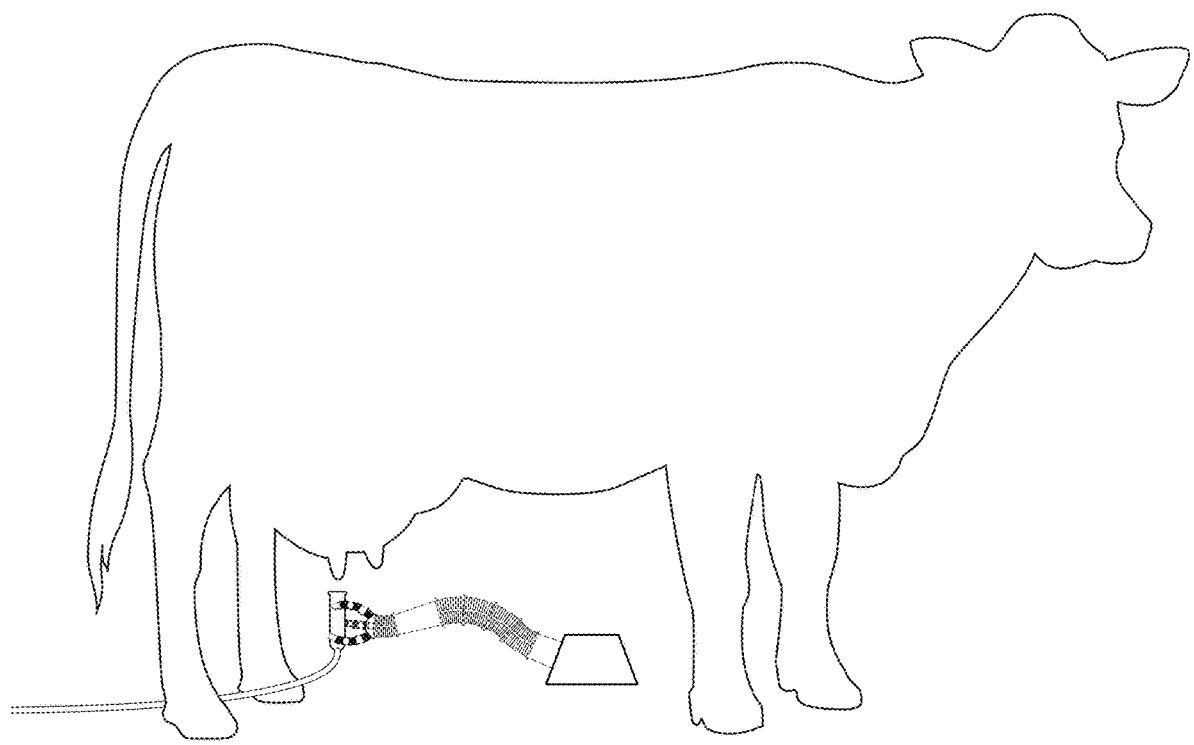
Figure 25:
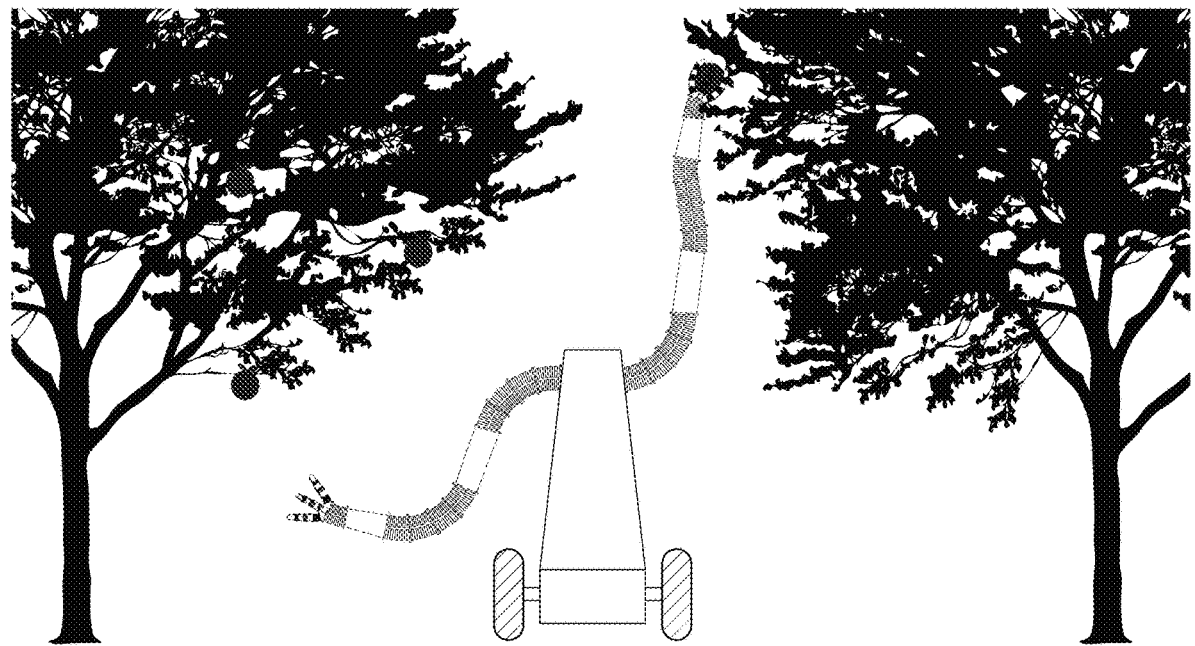

FIGS. 23, 24, and 25 illustrate applications of a serial manipulator. In some embodiments, FIGS. 23, 24, and 25 illustrate applications of the serial manipulator of FIG. 19.

FIG. 23 illustrates an embodiment of a serial manipulator designed for putting away dishes. FIG. 24 illustrates an embodiment of a serial manipulator designed for milking a cow. FIG. 25 illustrates an embodiment of a serial manipulator designed for picking fruit.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic device that comprises:
a plurality of fluidic actuators configured to bend about an axis in response to fluid being introduced to or fluid being released from at least a first and second separate fluid chamber of the fluidic actuators, with each fluidic actuator having position, pressure and stiffness individually controlled by fluid being introduced to or fluid being released from at least a first and second separate fluid chamber, with each fluidic actuator configured to expand and elongate along a central axis length in response to fluid being introduced to the respective fluid chambers, and with each fluidic actuator comprising a first and second fluid valve collocated with the fluidic actuator;
a plurality of networked embedded nodes being collocated at a respective fluidic actuator, with each of the nodes configured for sensing and computation, including estimation of at least a portion of a state of the robotic device, execution of at least a portion of control of the robotic device, the plurality of networked embedded nodes configured for coordinated control of position, pressure and stiffness at each fluidic actuator based on data from the plurality of networked embedded nodes; and
a plurality of couplers respectively associated with at least one fluidic actuator including a first fluidic actuator coupled to a first coupler, a second fluidic actuator coupled to a second coupler and the second fluidic actuator coupled to the first coupler,
wherein the first and second fluidic actuator and first and second coupler define a length between a first and second end with the first coupler disposed between the first and second fluidic actuator and with the second fluidic actuator disposed between the first and second coupler.

2. The robotic device of claim 1, wherein the robotic device further comprises a manipulator and wherein the coordinated control of position, pressure and stiffness at each fluidic actuator based on data from the plurality of networked embedded nodes controls at least one of movement of the manipulator, position of the manipulator, configuration of the manipulator, or force applied between the manipulator and external objects.

3. The robotic device of claim 1, wherein position, pressure and stiffness of the fluidic actuators is controlled by the embedded nodes based at least in part on obtained sensing signals associated with two or more of: actuator position, actuator velocity, volume flow rate to or from each fluid chamber of an actuator, mass flow rate into or out of each fluid chamber of an actuator, and properties in each fluid chamber of an actuator, and
wherein control signals to control the fluidic actuators are determined based at least in part on the obtained sensing signals to close a feedback loop.

4. The robotic device of claim 1, wherein the fluid chambers of the fluidic actuators expand axially when fluid is introduced to the fluid chambers and wherein the fluid chambers of the fluidic actuators contract axially when fluid is removed from the fluid chambers.

5. The robotic device of claim 1, wherein the fluid chambers comprise a fabric coupled to an outside face of the fluid chambers, the fabric comprising:
circumferential fibers configured to constrain a fabric circumference for resisting a fluid chamber associated with the fabric from expanding circumferentially when fluid is introduced to the fluid chamber associated with the fabric.

6. The robotic device of claim 5, wherein the fabric is further configured to guide a bend of the fluid chamber associated with the fabric that occurs when fluid is introduced to the fluid chamber associated with the fabric and wherein the fabric is configured to stop expansion of the fluid chamber associated with the fabric at a maximum length defined by the fabric.

7. The robotic device of claim 6, wherein the first and second fluid chambers of the fluidic actuators comprise respective wedge-shaped fluid chambers and wherein an angular size of the respective wedge-shaped fluid chambers increases by fluid being introduced to the wedge-shaped fluid chambers.

8. The robotic device of claim 1, wherein the first and second fluid chambers of the fluidic actuators are mechanically constrained to each other or are coupled to a spine that extends between a pair of couplers.

9. A robotic device that comprises:
a plurality of fluidic actuators configured to bend about an axis in response to fluid being introduced to or fluid being released from portions of the fluidic actuators, with each fluidic actuator configured to elongate in response to fluid being introduced to the respective portions of the fluidic actuators; and
a plurality of couplers respectively associated with at least one actuator including a first actuator coupled to a first coupler, a second actuator coupled to a second coupler and the second actuator coupled to the first coupler,
wherein the first and second actuator and first and second coupler define a length between a first and second end with the first coupler disposed between the first and second actuator and with the second actuator disposed between the first and second coupler.

10. The robotic device of claim 9, wherein position, pressure and stiffness of each fluidic actuator is individually controlled by fluid being introduced to or fluid being released from at least a first and second separate fluid chamber of each actuator.

11. The robotic device of claim 9, further comprising a first and second fluid valve collocated with each fluidic actuator and respectively associated with a first and second separate fluid chamber of each actuator.

12. The robotic device of claim 9, further comprising a plurality of embedded nodes respectively collocated at respective fluidic actuators, with each of the nodes configured for estimation of at least a portion of a state of the robotic device and configured for execution of at least a portion of control of the robotic device.

13. The robotic device of claim 12, wherein the plurality of networked embedded nodes are configured for control of one or more of position, pressure and stiffness at each fluidic actuator based at least in part on data from the plurality of networked embedded nodes.

14. The robotic device of claim 13, wherein the control of each fluidic actuator based on data from the plurality of networked embedded nodes includes control of at least one of movement of a manipulator, position of a manipulator, configuration of a manipulator, or force applied between a manipulator and external objects.

15. The robotic device of claim 12, wherein the fluidic actuators are controlled by the embedded nodes based at least in part on obtained sensing signals associated with two or more of: actuator position, actuator velocity, volume flow rate to or from each fluid chamber of an actuator, mass flow rate into or out of each fluid chamber of an actuator, and properties in each fluid chamber of an actuator.

16. The robotic device of claim 15, wherein control signals to control the fluidic actuators are determined based at least in part on the obtained sensing signals to close a feedback loop.

17. The robotic device of claim 9, wherein the fluidic actuators comprise two or more fluid chambers that expand axially when fluid is introduced to the fluid chambers and wherein the fluid chambers of the fluidic actuator contract axially when fluid is removed from the fluid chambers.

18. The robotic device of claim 17, wherein the fluid chambers comprise:
    axial fibers configured to straighten as the fluid chambers in an axial direction; and
    circumferential fibers configured to constrain the fluid chambers from expanding circumferentially when fluid is introduced to the fluid chamber associated.

19. The robotic device of claim 18, wherein the at least one of the axial fibers and circumferential fibers guide a bend of the fluid chambers that occurs when fluid is introduced to the fluid chambers.

20. The robotic device of claim 18 wherein the axial fibers are configured to stop expansion of the fluid chambers at a maximum length defined by the axial fibers.

\* \* \* \* \*